US011908307B2

(12) United States Patent
Hoofe, IV

(10) Patent No.: US 11,908,307 B2
(45) Date of Patent: Feb. 20, 2024

(54) SECURITY SYSTEM

(71) Applicant: William J. Hoofe, IV, Newport Beach, CA (US)

(72) Inventor: William J. Hoofe, IV, Newport Beach, CA (US)

( * ) Notice: Subject to any disclaimer, the term of this patent is extended or adjusted under 35 U.S.C. 154(b) by 354 days.

(21) Appl. No.: 17/397,969

(22) Filed: Aug. 9, 2021

(65) Prior Publication Data

US 2021/0407280 A1 Dec. 30, 2021

Related U.S. Application Data

(63) Continuation-in-part of application No. 16/435,456, filed on Jun. 7, 2019, now abandoned.

(60) Provisional application No. 62/682,019, filed on Jun. 7, 2018.

(51) Int. Cl.
*G08B 29/04* (2006.01)
*G08B 13/08* (2006.01)

(52) U.S. Cl.
CPC ............. *G08B 29/04* (2013.01); *G08B 13/08* (2013.01)

(58) Field of Classification Search
CPC ................................ G08B 29/04; G08B 13/08
See application file for complete search history.

(56) References Cited

U.S. PATENT DOCUMENTS 3,710,371 A 1/1973 Whalen
3,842,410 A 10/1974 Gopperton
4,054,752 A 10/1977 Dennis
4,234,875 A 11/1980 Williams
4,242,670 A 12/1980 Smith
4,337,462 A 6/1982 Lemelson
4,559,880 A 12/1985 Lacka
4,692,745 A 9/1987 Simanowitz
4,797,663 A 1/1989 Rios
4,977,392 A 12/1990 Loda
5,716,114 A 2/1998 Holmes
5,745,366 A 4/1998 Higham
5,786,755 A 7/1998 Cicchino
5,905,653 A 5/1999 Higham
5,927,540 A 7/1999 Godlewski
6,039,467 A 3/2000 Holmes
6,075,441 A 6/2000 Maloney
6,084,511 A * 7/2000 Kil ........................ G08B 13/08 340/545.9
6,130,621 A 10/2000 Weiss
6,263,260 B1 7/2001 Bodmer
6,429,893 B1 8/2002 Xin
6,640,159 B2 10/2003 Holmes
6,831,559 B2 12/2004 Chen
6,965,294 B1 11/2005 Elliott
7,119,678 B2 10/2006 Katz
7,385,521 B2 6/2008 Macari
7,659,816 B2 * 2/2010 Wandel ................ B65D 55/026 340/572.8
7,665,326 B2 2/2010 Leclear
7,668,620 B2 2/2010 Shoenfeld
7,737,840 B2 6/2010 Kopp
7,847,675 B1 12/2010 Thyen
(Continued)

*Primary Examiner* — Albert K Wong

(57) ABSTRACT

A system includes one or more sensors to monitor at least one compartment of an object. A processor is communicatively-coupled to the one or more sensors to determine an alarm event based on activation of at least one sensor of the one or more sensors.

5 Claims, 11 Drawing Sheets

(56) References Cited

U.S. PATENT DOCUMENTS

| | | | | |
|---|---|---|---|---|
| 8,067,915 | B2 | 11/2011 | Hooker | |
| 8,339,261 | B1 * | 12/2012 | Wolski | E05B 65/0075 340/568.1 |
| 8,436,731 | B2 | 5/2013 | Davis | |
| 8,478,447 | B2 | 7/2013 | Fadell | |
| 8,588,966 | B2 | 11/2013 | Michael | |
| 8,730,041 | B2 | 5/2014 | Roberts | |
| 8,742,889 | B2 | 6/2014 | Kaczmarz | |
| 8,744,621 | B2 | 6/2014 | Michael | |
| 9,052,994 | B2 * | 6/2015 | Lockwood | G07G 3/003 |
| 9,195,804 | B2 | 11/2015 | Shoenfeld | |
| 9,208,676 | B2 | 12/2015 | Fadell | |
| 9,483,896 | B2 * | 11/2016 | Lockwood | G07F 17/14 |
| 9,501,924 | B2 | 11/2016 | Kennedy | |
| 9,514,636 | B2 | 12/2016 | Modi | |
| 9,524,626 | B2 | 12/2016 | Brühwiler | |
| 9,672,705 | B2 | 6/2017 | Modi | |
| 9,681,722 | B2 | 6/2017 | Simpson | |
| 9,787,424 | B2 | 10/2017 | Filson | |
| 9,881,492 | B2 | 1/2018 | Vildosola | |
| 9,940,798 | B2 | 4/2018 | Peterson | |
| 10,229,567 | B2 * | 3/2019 | Ricks | E05D 15/00 |
| 10,258,131 | B2 | 4/2019 | Yim | |
| 10,339,773 | B2 | 7/2019 | Kennedy | |
| 10,401,018 | B1 * | 9/2019 | Smith | A47B 77/00 |
| 10,445,961 | B1 | 10/2019 | Chen | |
| 10,475,305 | B2 * | 11/2019 | Jonsson | G08B 13/08 |
| 10,504,199 | B2 | 12/2019 | Tada | |
| 10,551,051 | B2 * | 2/2020 | Smith | F21V 23/04 |
| 10,721,444 | B2 | 7/2020 | Rabinowitz | |
| 10,801,717 | B2 * | 10/2020 | Smith | H05B 45/10 |
| 11,631,320 | B2 * | 4/2023 | Lamb | G08B 25/008 340/506 |
| 11,657,687 | B2 * | 5/2023 | Thibault | G08B 21/22 340/545.1 |
| 11,754,331 | B2 * | 9/2023 | Trammell | F24F 1/46 62/183 |
| 2010/0033329 | A1 | 2/2010 | Davis | |
| 2015/0048625 | A1 | 2/2015 | Weusten | |
| 2016/0106622 | A1 | 4/2016 | van de Vouw | |
| 2016/0189527 | A1 | 6/2016 | Peterson | |
| 2016/0239723 | A1 | 8/2016 | Ge | |
| 2018/0004840 | A1 | 1/2018 | Herbelin | |
| 2018/0330597 | A1 | 11/2018 | Burke | |
| 2020/0088464 | A1 * | 3/2020 | Coradetti | F25D 29/008 |
| 2020/0158318 | A1 | 5/2020 | Paul | |
| 2023/0284775 | A1 * | 9/2023 | Brooks | A47B 57/06 312/319.7 |

* cited by examiner

SECURITY SYSTEM

CROSS-REFERENCE TO RELATED APPLICATIONS

This application is a continuation-in-part of U.S. patent application Ser. No. 16/435,456, filed Jun. 7, 2019, which claims the benefit of the filing date of U.S. Provisional Application Ser. No. 62/682,019, filed on Jun. 7, 2018 and titled "Security Systems and Methods," the entireties of which are incorporated herein by reference.

BACKGROUND

1. Technical Field

The subject matter disclosed herein generally relates to the field of security systems.

2. Related Art

A security system may include many devices, such as sensors for detecting unauthorized intrusion, sensors for detecting fire, smoke or toxic gas, one or more keypads for arming or disarming the security system, and one or more processors to process data received from the sensors. Alarm systems for warning of unauthorized intrusion into a structure are most commonly designed to detect the unauthorized opening or removal of the doors or windows of the structure. Security extends past the ability to secure a structure or room. The security for items contained in drawers or cabinets is also of importance.

Some premises are equipped with smart networks to provide automated control of devices, appliances and systems, such as lighting systems, heating, ventilation, and air conditioning ("HVAC") systems, home theater, entertainment systems, as well as security systems.

Numerous electronic devices may be connected in a wireless network throughout a home or a building. For example, a security alarm system may include one or more sensors disposed at one or more windows, doors, and other entry points of the smart-home or smart-building environment for detecting when a window, door, or other entry point is opened, broken, and/or breached. Many of these sensor devices may communicate wirelessly with a hub device. The hub may also be in wireless communications with other electronic devices, such as thermostats, appliances, air conditioning units, hazard detectors to detect the presence of a hazardous substance or a substance indicative of a hazardous substance (e.g., smoke, fire, flood, or carbon monoxide), routers, doorbells, and wall switches, to name a few. The electronic devices may communicate with the hub and/or each other using one or more wireless communication channels. The electronic devices may integrate seamlessly with each other and/or with a central server or a cloud-computing system to provide home-security and smart-home features.

"Smart home" and "smart building" are terms that generally refer to constructing networks among various devices in a home or a building, in which those devices may communicate with one another through wired or wireless networks in the residential premises/building and are also linked to an external network (e.g., the Internet). Smart-home networks, for example, may include central hubs or a control panel that provides a user interface for receiving user input and controlling the various devices, appliances, and security systems in the home or building complex. When an intruder breaks into a smart-home environment, a security system in the home or building complex may trip and sound an alarm and/or send a signal to a monitoring service, law enforcement entity, or the like.

Security systems typically have two states or modes of operation, that is, armed and unarmed. A security system is considered "armed" when components of the system are operational and set in a secured state, that is, a state in which the component generates a response to an event, such as intrusion e.g., should a monitored door or window suddenly be opened. Otherwise, the security system is considered "unarmed." Some sensors (e.g., carbon monoxide detectors and smoke, heat and freeze detectors) are armed 24 hours-a-day; other sensors are only armed when the system is armed.

A home security system may operate in two (armed) modes that may be generally referred to as "away" and "stay." The stay mode of arming the system may refer to the home security system's state when the occupants are home. The home security system may ignore a window or door being opened (or in any event, not trigger an intrusion alarm) while in the stay mode. The away mode is used when the occupants of the home plan on arming the system and leaving the premises. Arming in the away mode will not bypass any sensors, and the entire system will be armed. Thus, the armed mode of the home security system can affect the actions taken by the home security system in response to sensed activities in the home.

There is a continuing need for improved security systems to safeguard persons and property against a broad range of hazards and prevent unauthorized persons from gaining access to protected areas of a building or premises and/or compartments disposed within objects on the premises.

BRIEF SUMMARY

Various techniques for providing home security objectives are disclosed herein.

Various embodiments of the disclosed subject matter provide security systems and methods.

In some embodiments of the disclosed subject matter, a security system may be a stand-alone, self-monitoring system. In other embodiments of the disclosed subject matter, a security system may be monitored by a central station. In some embodiments of the disclosed subject matter, a security system may be selectively switchable between a stand-alone, self-monitoring system and a system monitored by a central station.

Embodiments of the disclosed subject matter may provide, or be part of, a DIY security system.

In some embodiments of the disclosed subject matter, a security system may be part of a smart-home environment.

It will be understood that certain aspects of the disclosed systems and methods can be arranged and combined in a wide variety of different configurations, all of which are contemplated herein. The illustrative system and method embodiments described herein are not meant to be limiting.

Embodiments of the disclosed subject matter generally relate to a plurality of devices, which may include intelligent, multi-sensing, network-connected devices, that communicate with each other and/or with a central server or a cloud-computing system to provide any of a variety of home-security objectives.

Embodiments of the disclosed subject matter provide a security system and methods of providing a help alert and/or panic alarm.

Embodiments of the disclosed subject matter may provide a smart-home environment with a security system. Embodiments described herein are representative examples of devices, methods, systems, services, and/or computer program products that can be used in conjunction with an extensible devices and services platform that, while being particularly applicable and advantageous for providing security objectives in the smart home context, is generally applicable to any type of enclosure or group of enclosures (e.g., factory building, office building, retail store, high-rise building, hotel, educational facilities), vessels (e.g., automobiles, aircraft), or other resource-consuming physical systems that will be occupied by humans or with which humans will physically or logically interact. Thus, although particular examples are set forth in the context of a smart home, it is to be appreciated that the scope of applicability of the described extensible devices and services platform is not so limited.

The details of one or more embodiments are set forth in the description and drawings below. Other features will be apparent from the description and drawings, and from the claims.

BRIEF DESCRIPTION OF THE DRAWINGS

Objects and features of the presently-disclosed systems and methods will become apparent to those of ordinary skill in the art when descriptions of various embodiments thereof are read with reference to the accompanying drawings, of which.

DETAILED DESCRIPTION

Figure 1:
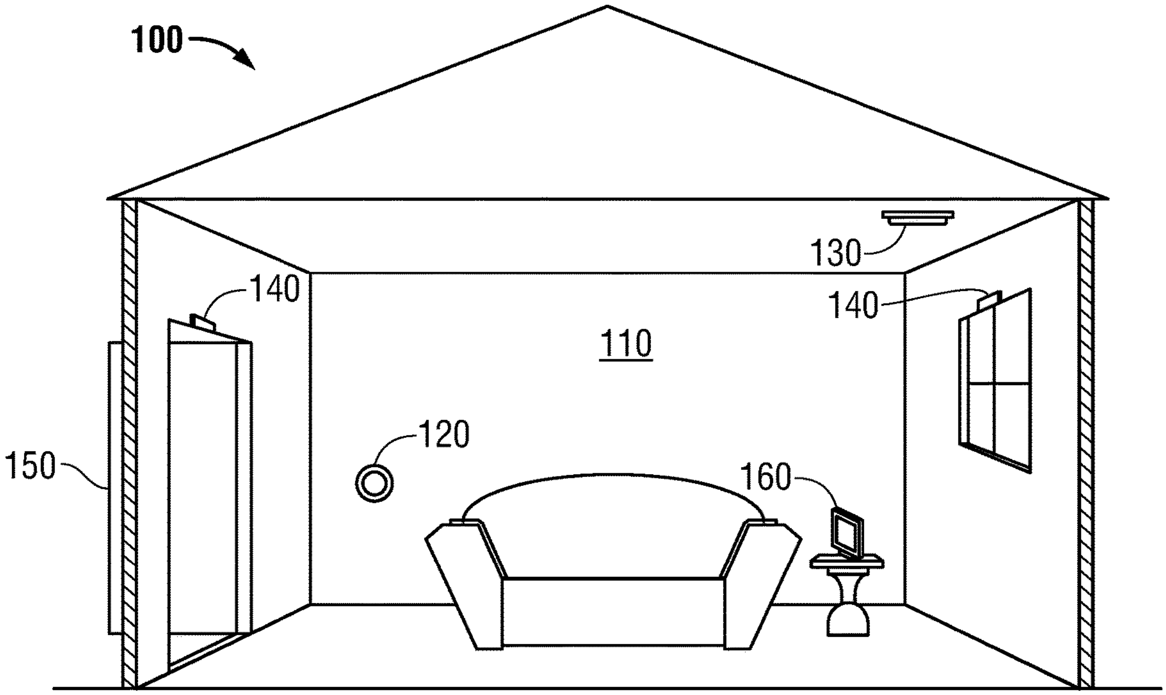
FIG. 1 shows an example premises of a home security system as disclosed herein.

Hereinafter, embodiments of a security system and methods of providing a help alert and/or panic alarm are described with reference to the accompanying drawings. Like reference numerals may refer to similar or identical elements throughout the description of the figures.

Various aspects and possible implementations of providing home-security objectives are disclosed herein. Various embodiments of the disclosed subject matter provide devices, methods, systems, services, and/or computer program products to provide any of a variety of home-security objectives. Various aspects, embodiments or features will be presented in terms of systems that may include a number of devices, components, modules, and the like. It is to be understood and appreciated that the various systems may include additional devices, components, modules, and so on, and/or may not include all of the devices, components, modules and so on, described in connection with the figures. The various features of the embodiments disclosed herein can be used alone, or in varying combinations with each other and are not intended to be limited to the specific combination described herein. Thus, the scope of the claims is not to be limited by the illustrated embodiments.

This description may use the phrases “in an embodiment,” “in embodiments,” “in some embodiments,” or “in other embodiments,” which may each refer to one or more of the same or different embodiments in accordance with the present disclosure.

It is to be understood that the terminology used herein is for the purpose of describing particular embodiments only, and is not intended to be limiting. As it is used in this description, “sensor” generally refers to any device that can obtain information about its environment. For the purposes of this description, the terms "smart-home" and "smart-building" are used interchangeably.

Embodiments disclosed herein may use one or more sensors. Sensors may be described by the type of information they collect. For example, sensor types as disclosed herein may include motion, smoke, carbon monoxide, proximity, temperature, time, physical orientation, acceleration, location, entry, presence, pressure, light, sound, and the like. A sensor also may be described in terms of the particular physical device that obtains the environmental information. For example, an accelerometer may obtain acceleration information, and thus may be used as a general motion sensor and/or an acceleration sensor. A sensor also may be described in terms of the specific hardware components used to implement the sensor. For example, a temperature sensor may include a thermistor, thermocouple, resistance temperature detector, integrated circuit temperature detector, or combinations thereof. A sensor also may be described in terms of a function or functions the sensor performs within an integrated sensor network, such as a smart-home environment as disclosed herein. For example, a sensor may operate as a security sensor when it is used to determine security events such as unauthorized entry. A sensor may operate with different functions at different times, such as where a motion sensor is used to control lighting in a smart-home environment when an authorized user is present, and is used to alert to unauthorized or unexpected movement when no authorized user is present, or when an alarm system is in an "armed" (e.g., away) state, or the like. In some cases, a sensor may operate as multiple sensor types sequentially or concurrently, such as where a temperature sensor is used to detect a change in temperature, as well as the presence of a person or animal. A sensor also may operate in different modes at the same or different times. For example, a sensor may be configured to operate in one mode during the day and another mode at night. As another example, a sensor may operate in different modes based upon a state of a home security system or a smart-home environment, or as otherwise directed by such a system.

In general, a "sensor" as disclosed herein may include multiple sensors or sub-sensors, such as where a position sensor includes both a global positioning sensor (GPS) as well as a wireless network sensor, which provides data that can be correlated with known wireless networks to obtain location information. Multiple sensors may be arranged in a single physical housing, such as where a single device includes movement, temperature, magnetic, and/or other sensors. Such a housing also may be referred to as a sensor, a sensor device, or a sensor package. For clarity, sensors are described with respect to the particular functions they perform and/or the particular physical hardware used, when such specification is necessary for understanding of the embodiments disclosed herein.

FIG. 1 shows an example system 100, installed within a premises 110. The system 100 may include multiple types of devices, such as one or more intelligent, multi-sensing, network-connected thermostats 120 (e.g., "smart thermostats"), one or more intelligent, multi-sensing, network-connected hazard detection units 130 (e.g., "smart hazard detectors"), one or more intelligent, multi-sensing, network-connected entry detection units 140, one or more network-connected doorknobs 150 (e.g., "smart doorknobs"), and one or more intelligent, multi-sensing, network-connected controller devices 160.

Generally, the system 100 may be configured to operate as a learning, evolving ecosystem of interconnected devices. New devices may be added, introducing new functionality or expanding existing functionality. Existing devices may be replaced or removed without causing a failure of the system 100. Such removal may encompass intentional or unintentional removal of components from the system 100 by the user, as well as removal by malfunction (e.g., loss of power, destruction by intruder, etc.).

The system shown in FIG. 1 may be a part of a smart-home environment. The smart-home environment including the system 100 shown in FIG. 1 may include a plurality of devices, including intelligent, multi-sensing, network-connected devices, that can integrate seamlessly with each other and/or with a central server or a cloud-computing system (e.g., controller 73 and/or remote system 74, shown in FIG. 5B) to provide home-security and smart-home features.

A security system in accordance with the disclosed subject matter may include one or more devices including processing and/or sensing capabilities (e.g., "smart devices," controller devices, computing devices, or the like). In some embodiments, in addition to containing processing and/or sensing capabilities, one or more of the devices is capable of data communications and information sharing with other devices (e.g., mobile internet-enabled devices, such as handhelds, Palms, PDAs, pocket PCs, smart phones, or the like), as well as to any central server or cloud-computing system or any other device that is network-connected anywhere in the world. The required data communications can be carried out using any of a variety of custom or standard wireless protocols (e.g., Wi-Fi, ZigBee®, 6LoWPAN, etc.) and/or any of a variety of custom or standard wired protocols (e.g., CAT6 Ethernet, HomePlug, etc.).

The devices for implementing certain elements that are a part of embodiments of the disclosed subject matter may include one or more network interfaces each configured to associate with and communicate via one or more communication networks (e.g., a wired network, a wireless network, a cellular network, etc.). In embodiments, one or more of the network interfaces may be virtual or logical as opposed to physical. In some embodiments, one or more communication networks may be a decentralized type of wireless network (e.g., a wireless ad hoc network (WANET)).

In some embodiments, the majority of network interfaces may include distinct hardware relative to the type, kind, or protocol of a communications network that a network interface is intended to access (e.g., an antenna tuned to the frequency of the RF transmission protocol it is configured to detect). For example, embodiments may use an antenna tuned to ~2.4 GHz for detecting Bluetooth and Wi-Fi transmissions, an antenna tuned to 2-8 GHz, an antenna tuned to other frequencies such as 800 MHz, 900 MHz, 1800 MHz, 1900 MHz, and/or 2100 MHz, and/or a range of frequencies, a registered jack 45 (RJ45) physical port for accepting a wire/cable with an 8 position 8 conductor (8P8C) modular plug, etc. The network interface may include a component that enables the device to communicate between devices. In an embodiment, the network interface may communicate using a standard network protocol, such as Bluetooth® Low Energy (BLE), Dust Networks®, Z-wave, Wi-Fi, and ZigBee®. Additionally, or alternatively, the network interface may communicate via an efficient network layer protocol (e.g., Thread™). The network interface may also include a wired component, in certain embodiments. The wired component may enable wired communication (e.g., Ethernet communication) with other devices.

Each of these network interfaces may access the communications network via a different communications protocol (e.g., a Wi-Fi or Wireless Local Area Network (LAN)

protocol, a cellular data protocol, a wired protocol, etc.) or communication network (e.g., a home LAN, a cellular company's communications network, a business intranet, etc.).

Examples of a Wi-Fi protocol may include, but are not limited to: Institute of Electrical and Electronics Engineers (IEEE) 802.11g, IEEE 802.11n, etc. Examples of a cellular protocol may include, but are not limited to: IEEE 802.16m (a.k.a Wireless-MAN (Metropolitan Area Network) Advanced), Long Term Evolution (LTE) Advanced), Enhanced Data rates for GSM (Global System for Mobile Communications) Evolution (EDGE), Evolved High-Speed Packet Access (HSPA+), etc. Examples of a wired protocol may include, but are not limited to: IEEE 802.3 (a.k.a. Ethernet), Fibre Channel, Power Line communication (e.g., HomePlug AV, GP and AV2, IEEE 1901, etc.), etc. It is understood that the above are merely a few illustrative examples to which the disclosed subject matter is not limited.

Figure 2:
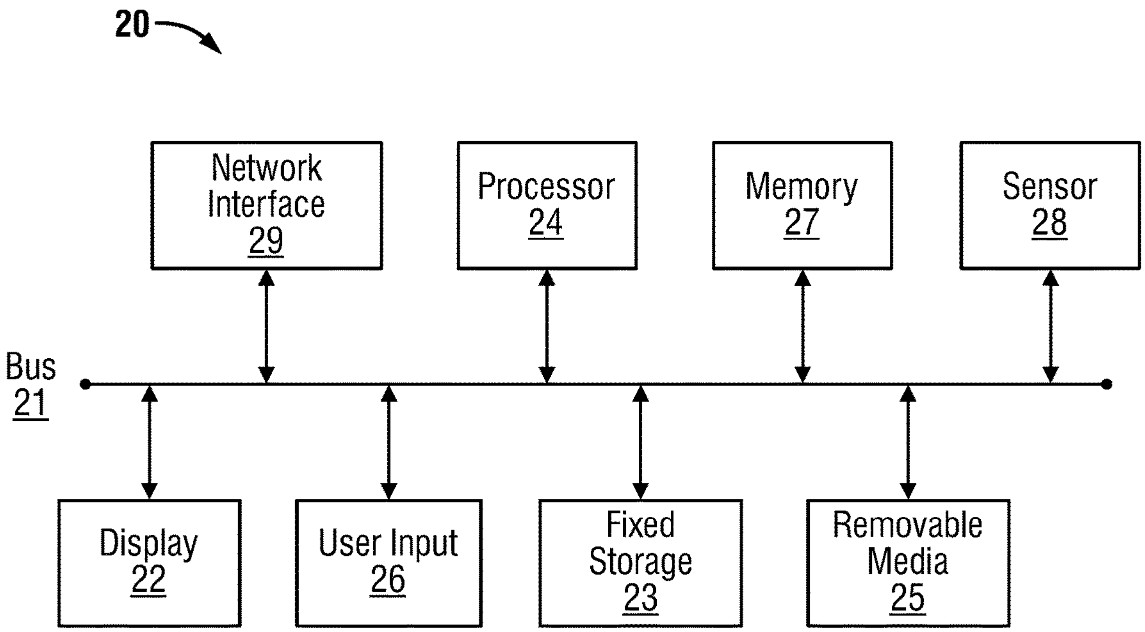
FIG. 2 shows a computing device according to an embodiment of the disclosed subject matter.

FIG. 2 shows an example device 20 (e.g., "smart device," controller device, computing device, or the like) suitable for implementing certain elements that are a part of embodiments of the disclosed subject matter. The device 20 may be constructed as a custom-designed device, or may be, for example, a special-purpose desktop computer, notebook or laptop computer, or mobile computing device such as a smart phone, tablet, or the like. In some embodiments, the device 20 may be a general-purpose microprocessor, or device 20 may be a custom Arduino or ESP8266 device or other custom-designed device. It is understood that the device 20 may include any type of computing device, computational circuit, or any type of processor or processing circuit capable of executing a series of instructions that are stored in a memory.

The device 20 may be used to implement, for example, a controller device (e.g., controller device 160 shown in FIG. 1) or other devices, for example, devices including sensors and/or communicatively-coupled to sensors. In implementation as a controller device 160, device 20 may include one or more sensors 28. The sensor 28 may be implemented as, for example, a light sensor, an accelerometer, a magnetic sensor, passive infrared (PIR), or any other suitable sensor. More generally, the sensor 28 may include one or more sensors as disclosed herein or a combination of such sensors.

The device 20 may store the data in intervals on an on-going basis, for example, in fixed storage 23, removable media 25, or in a storage external to the device 20 via network interface 29. In some embodiments, data may be stored in association with a timestamp indicating a time that the data was generated. Immediately stored data, such as the most-recently stored data, may be referred to as "current data," while stored data which is no longer current may be referred to as "historical data."

Historical data may remain stored for a predetermined amount of time. For example, to conserve storage space the device 20 may be configured to store historical data for a period of one week, after which the data is deleted. This period of time may be adjusted by the user and/or automatically by the device 20 in accordance with available storage space and/or other parameter(s).

Figure 3A:
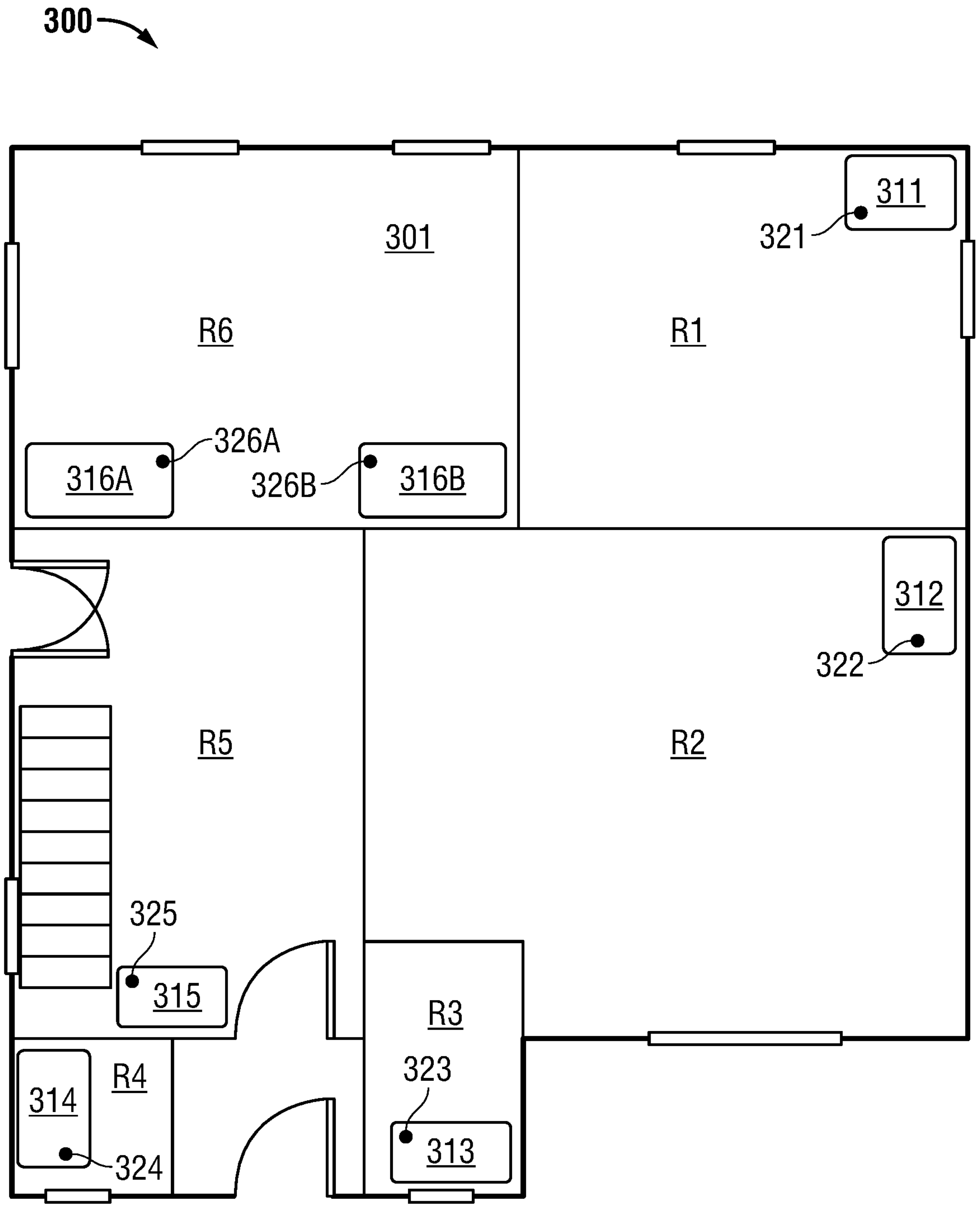
FIG. 3A shows an example system within a premises including objects having at least one compartment defined therein according to an embodiment of the disclosed subject matter.

FIG. 3A shows an example system 300 within a premises 301. For example, the premises 301 may be a home (e.g., house, condominium unit, single unit in an apartment building or other multiple-occupancy dwelling, or any residence inside of a residential building), office, garage, mobile home, or the like. Alternatively, the premises 301 may be a lodging accommodation (e.g., hotel suite, hotel room, cruise ship suite, boat cabin, train cabin, motorhome, recreational vehicle) or the like. It is understood that the premises 301 may be any type of enclosure or group of enclosures (e.g., dwelling house, factory building, office building, retail store, high-rise building, hotel, educational facility, medical facility, military facility) or any type of vehicle, vessel, boat, ship, aircraft, or spacecraft. In other embodiments of the disclosed subject matter, the system 300 may be implemented to include one or more objects in an outdoor environment.

The system 300 shown in FIG. 3A may be implemented as a stand-alone, self-monitoring system. The system 300 may be monitored by a central station. The system 300 may be selectively switchable between a stand-alone, self-monitoring system and a system monitored by a central station, for example, depending on user preferences, which may be identified by artificial intelligence.

The system shown in FIG. 3A may provide, or be part of, a DIY (do-it-yourself) security system.

The system shown in FIG. 3A may be a part of a smart-home environment. The smart-home environment including the system 300 shown in FIG. 3A may include a plurality of devices, including intelligent, multi-sensing, network-connected devices, that can integrate seamlessly with each other and/or with a central server or a cloud-computing system (e.g., controller 73 and/or remote system 74, shown in FIG. 5B) to provide home-security and smart-home features.

The premises 301 may include a plurality of rooms, for example, six rooms (e.g., as illustrated as R1, R2, R3, R4, R5, R6 in FIG. 3A). Each of the rooms may include one or more objects (e.g., as illustrated as objects 311, 312, 313, 314, 315, 316A, 316B in FIG. 3A) having at least one compartment defined therein. In the premises 301 illustratively depicted in FIG. 3A, the objects having at least one compartment defined therein may be, for example, furniture (e.g., dressers, vanities, dining room buffets, tables, desks, etc.) or cabinetry (e.g., kitchen cabinets/drawers, or built-in closet drawers, bathroom cabinets), and the like.). In other embodiments of the disclosed subject matter, the objects having at least one compartment defined therein may be office furnishings (e.g., desks or file cabinets), hotel room furnishings, retail store furnishings, or recreational boat furnishings, etc.

The system 300 shown in FIG. 3A includes a plurality of sensors (e.g., as illustrated as sensors 321, 322, 323, 324, 325, 326A, 326B) disposed within various compartments of the plurality of objects. One or more of the sensors may be communicatively-coupled to a processor (e.g., processor 410 shown in FIG. 4). Although only one sensor is shown disposed within each of the objects 311, 312, 313, 314, 315, 316A and 316B illustrated in FIG. 3A, it is understood that each object may include one or more sensors located within or operably associated with each compartment of the one or more compartments of the object.

In some embodiments of the system 300, the activation of a predetermined number of sensors located within compartments of an object is indicative of an alarm event (e.g., a help alert alarm, or unauthorized access alarm). For example, the object 311 may be a bedroom closet dresser having three or more drawers. In one example scenario, an unauthorized person (e.g., intruder) successively opens three (or two, or four, etc.) of the drawers of the dresser within a predetermined timeframe. The predetermined timeframe may be a time period (e.g., twenty seconds) during which the predetermined number of sensors (e.g., three sensors) must all be activated to be indicative of an alarm event. In some embodiments, the predetermined timeframe may be, for example, a time period between the activation of the individual sensors, for example, ten seconds.

The system 300 shown in FIG. 3A may be implemented to provide a help alert alarm and/or a panic alarm. For example, the system 300 may be implemented to analyze sensor data received from one or more sensors disposed within or operably associated with compartments of an object to determine whether a person is purposefully repeatedly opening and closing a drawer (or cabinet door, or the like) to signal for help. In an example scenario, a person located on the premises 301 experiences a serious medical condition, or an accident (e.g., slip and fall accident), and the ill- or injured-person is able to reach a drawer of an object (e.g., dresser drawer, bathroom cabinet door, etc.) having a configuration of sensors disposed within the compartments thereof. In some embodiments of the system 300, the repeated activation of a sensor a predetermined number of times (e.g., three times) within a predetermined timeframe is indicative of an alarm event, which may be, for example, a help alert alarm or a panic alarm. In an example scenario, a person located in one room of the premises 301 may hear or otherwise be aware of an unauthorized person (e.g., intruder) in another room, and the person may use the repeated opening and closing of a drawer of an object, for example as described above, to indicate a panic alarm.

The system 300 shown in FIG. 3A may be implemented to analyze sensor data received from one or more sensors disposed within one or more compartments of a plurality of objects to determine an alarm event. For example, in one scenario, a sensor (e.g., light sensor, magnetic sensor and/or acceleration sensor) located in a drawer of a table is activated and, within a predetermined timeframe, a sensor disposed within a safe is activated. In such case, the system 300 may sound an alarm and/or send a signal to a monitoring service, law enforcement entity, or the like.

Safes are used for a variety of purposes. For example, at home, a safe may be used to protect valuables, such as watch and jewelry collections, keepsakes, heirlooms, art and collectables, etc. In an office, a safe may be used to protect important documents and other items, such as checks, petty cash and employees' personal possessions. Safes are available in a wide variety of sizes and shapes to fit a wide range of office environments, home or home-office environments, non-office environments (e.g., restaurants, bars, retail establishments, schools, hotels, museums, and gyms), etc.

Figure 3B:
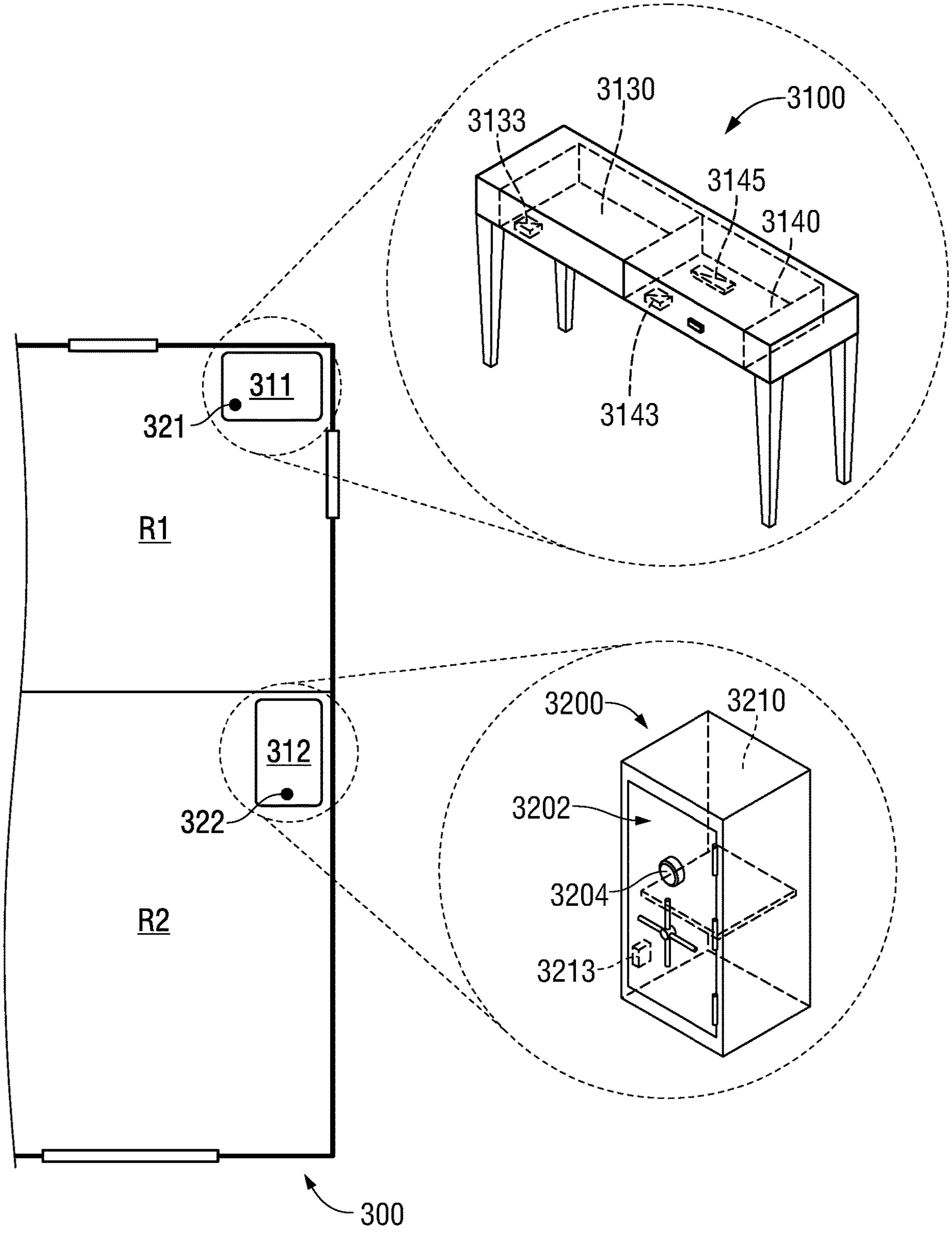
FIG. 3B shows a portion of the premises of FIG. 3A, along with enlarged views of two of the objects associated therewith, according to an embodiment of the disclosed subject matter.

According to some embodiments of the disclosed subject matter, an alarm event can be determined based on an analysis of the data generated by one or more sensors associated with a first object (e.g., object 311 located in room R1 of premises 301 of FIG. 3A) implemented as, for example, a dresser, chest of drawers, bureau, or table with drawers (e.g., table 3100 shown in FIG. 3B) and the data generated by one or more sensors associated with a second object (e.g., object 312 located in room R2 of premises 301) implemented as, for example, a locking storage cabinet or a safe (e.g., safe 3200 shown in FIG. 3B).

In an example embodiment shown in FIG. 3B, the table 3100 includes two drawers defining therein a first compartment 3130 and a second compartment 3140. For example, a first sensor 3133 may be disposed within or operably associated with the first compartment 3130 of the table 3100, and a second sensor 3143 may be disposed within or operably associated with the second compartment 3140. A processor may be operably coupled to the first sensor 3133 and the second sensor 3143. As previously described, the system 300 may be implemented to analyze sensor data received from one or more sensors (e.g., first sensor 3133, second sensor 3143) disposed within one or more compartments to determine an alarm event (e.g., a help alert alarm, or unauthorized access alarm).

In embodiments, the safe 3200 includes a box structure having two opposed and spaced apart parallel planar surfaces defining a top surface and a bottom surface and four side surfaces substantially at right angles to the top and bottom surfaces. The box structure generally includes: an interior 3210 for storing contents disposed therein; one surface formed with an opening in at least a portion of the surface for providing access to the interior 3210; and a door 3202 mounted in the opening and movable between a closed and an open position. In an embodiment, the safe 3200 includes a lock mechanism (not shown) and an electronic keypad 3204 mounted on the door 3202 and coupled to an actuator coupled to the lock mechanism for selectively placing the door 3202 in a locked condition.

The safe 3200 may include a device 3231 for monitoring of the opening of the door 3202. The device 3231 may include one or more sensors for detecting when the safe door 3202 is opened. A processor may be operably coupled to the one or more sensors and configured to generate an alert upon detection of the opening of the door 3202. In an embodiment, the device 3231 includes a protruding switch lever arm (not shown) arranged such that it is held open during closure of the door 3202, but is allowed to close when the door 3202 is opened.

In an embodiment of the system 300, the opening of one or more drawers of the table 3100 and the subsequent opening of the safe 3200 within a predetermined period of time (e.g., a short interval, such as a 10-minute interval, or the like) is indicative of an alarm event. Although, in the example embodiment depicted in FIG. 3B, the object 311, implemented as a table 3100, is located in a first room R1 of the premises 301, and the object 312, implemented as a safe 3200, is located in a second room R2, it is to be understood that the object 311 and object 312 may be located in the same room (or an adjoining space such as a closet).

For example, in one scenario, where an intruder makes entry into a premises 301 and threatens to use force upon or toward a person who occupies the premises 301 to coerce the occupant to open a safe 3200, the distressed occupant is able to assert, plausibly enough, under the circumstances, that he or she cannot remember how to open the safe (perhaps after a failed attempt(s), which might be purposeful, or not) and inform the intruder that the combination to the safe 3200 is written in a log 3145 contained in a table drawer (e.g., table 3100). In accordance with an embodiment of the system 300, the opening of a drawer within the table 3100, followed by the opening of the safe 3200 within a predetermined period of time is indicative of an alarm event. In such case, the system 300 may sound an alarm and/or send a signal to a monitoring service, law enforcement entity, or the like.

Figure 6A:
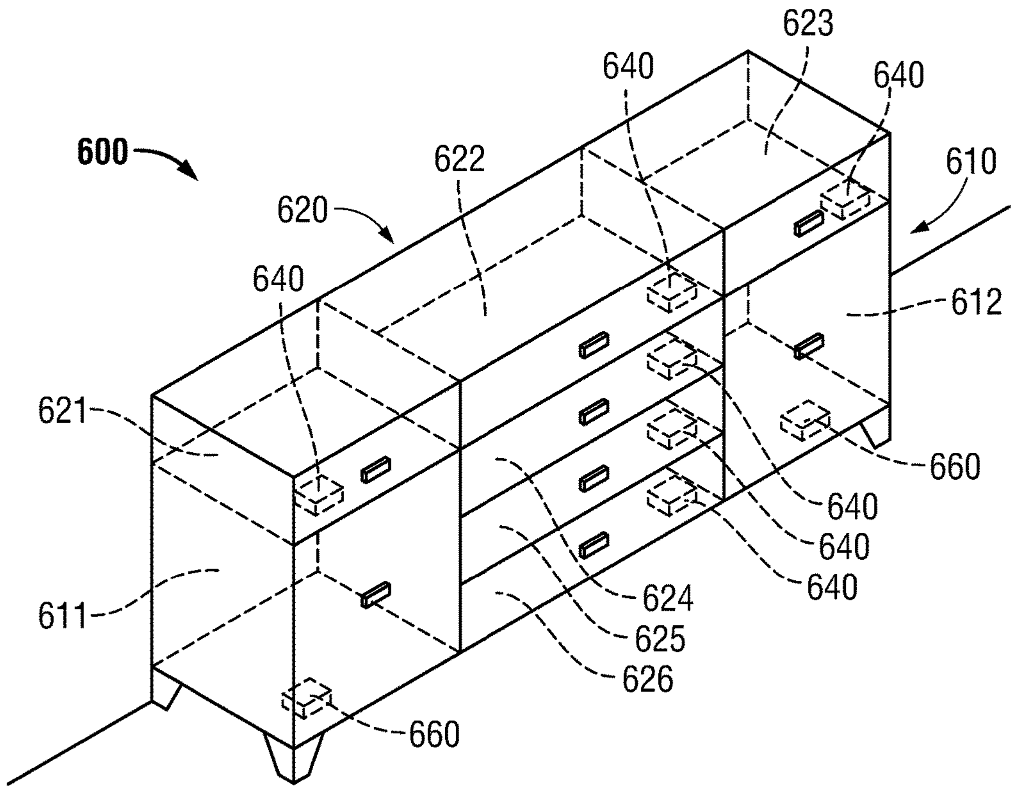
FIG. 6A shows an example of an object having at least one compartment defined therein disposed in a first configuration according to an embodiment of the disclosed subject matter.

FIG. 6A is an example of an object 600 having a plurality of cabinets 610 and a plurality of drawers 620. Each cabinet 610 defines a compartment therein (e.g., as illustrated as compartments 611, 612 in FIG. 6A). Each drawer 620 defines a compartment therein (e.g., as illustrated as compartments 621, 622, 623, 624, 625, 626 in FIG. 6A). Disposed within each compartment of the cabinets 610 is a senor 660. Disposed within each compartment of the drawers 620 is a senor 640. The sensor 640 and/or the sensor 660 may be implemented as, for example, a light sensor, an accelerometer, a magnetic sensor, passive infrared (PIR), or any other suitable sensor. More generally, the sensor 640 and/or the sensor 660 may include one or more sensors as disclosed herein or a combination of such sensors.

Figure 6B:
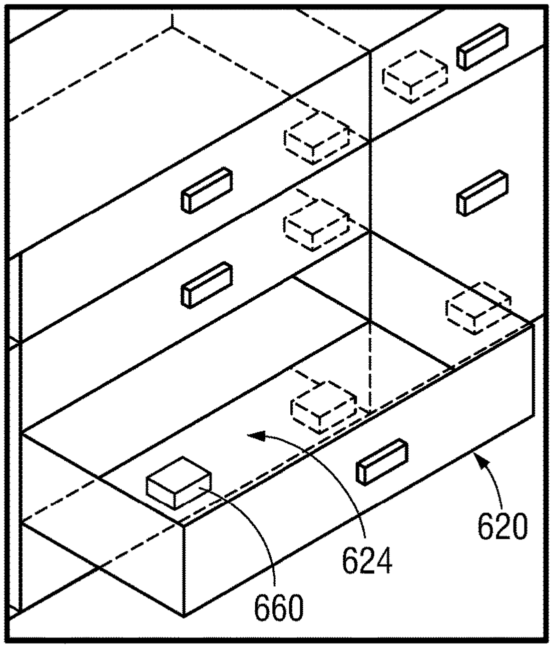
FIG. 6B shows the object of FIG. 6A disposed in a second configuration according to an embodiment of the disclosed subject matter.
Figure 6C:
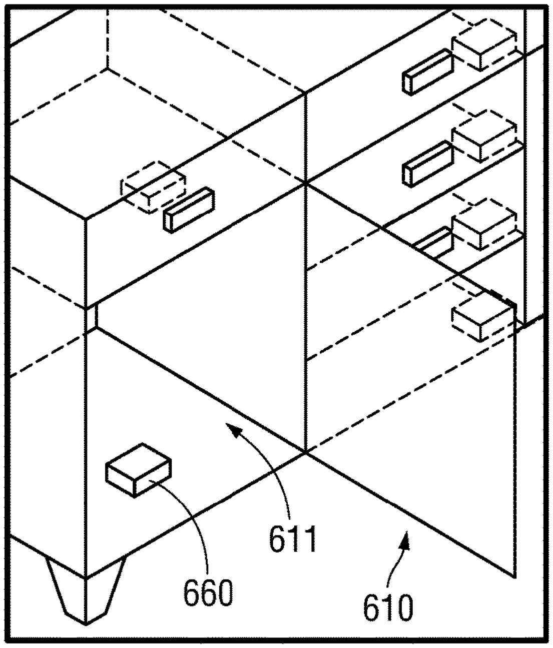
FIG. 6C shows the object of FIG. 6A disposed in a third configuration according to an embodiment of the disclosed subject matter.

In FIG. 6A, the object 600 is disposed in a configuration that may generally be referred to as a first configuration, in which all the cabinets 610 and drawers 620 are closed. In FIG. 6B, the object 600 is disposed in a configuration that may generally be referred to as a second configuration, in which one of the drawers 620 is open. In FIG. 6C, the object 600 is disposed in a configuration that may generally be referred to as a third configuration, in which one of the cabinets 610 is open. In some embodiments, the system 300 may be implemented to analyze sensor data received from one or more sensors disposed within one or more compartments of the object 600, as the result of the opening of one or more cabinets 610 and/or drawers 620 in a predetermined order, to determine an alarm event (e.g., a help alert alarm, or unauthorized access alarm). In such case, the system 300 may sound an alarm and/or send a signal to a monitoring service, law enforcement entity, or the like.

Figure 4:
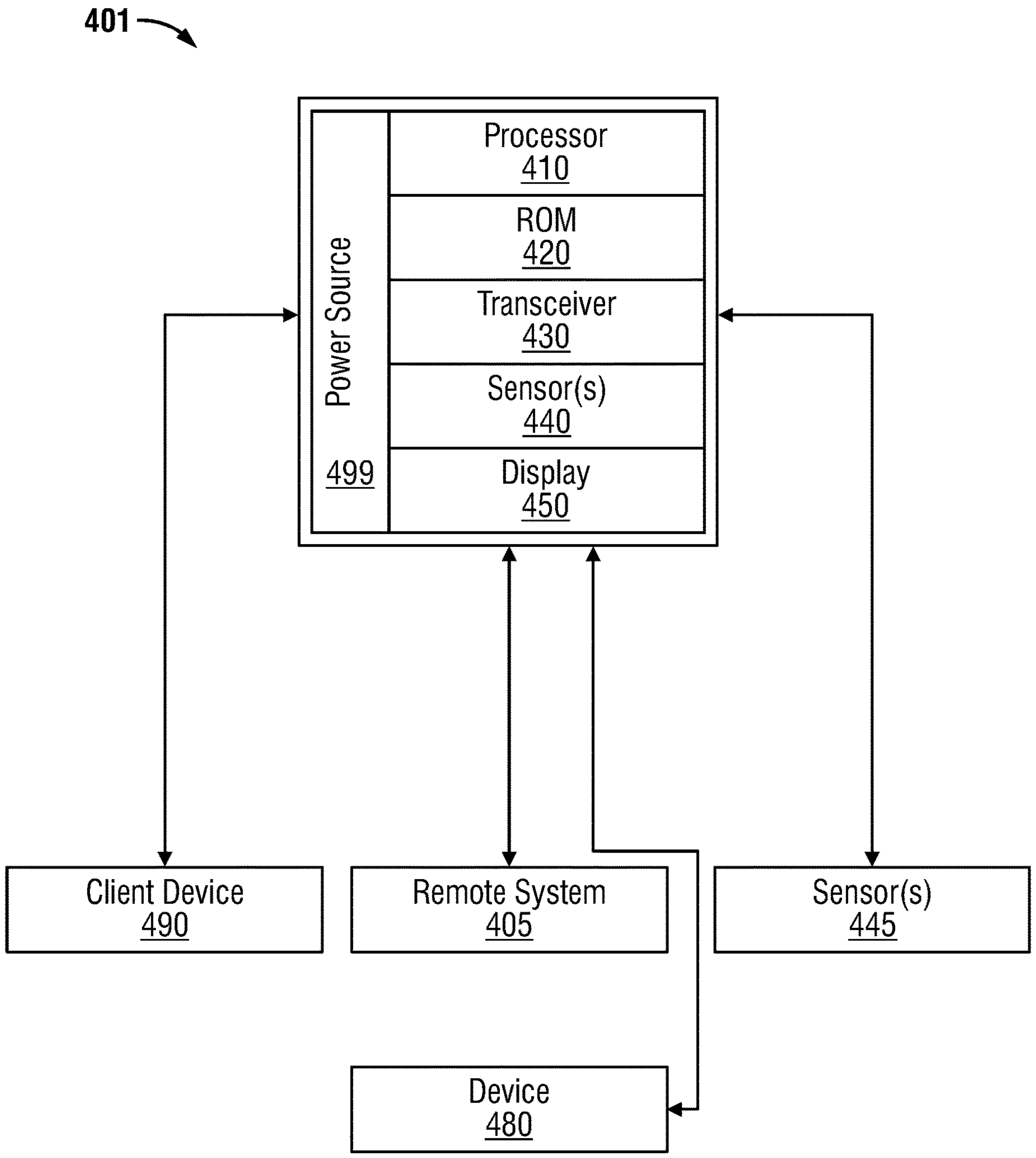
FIG. 4 shows an example of a home security system that may include one or more sensors and a processor communicatively coupled thereto as disclosed herein.

FIG. 4 is an example of a home security system that may include one or more sensors 440, 445 and a processor 410 communicatively-coupled thereto. The sensors 440, 445 may observe the premises of a home for a security event (e.g., an intrusion and/or abnormality). The controller 401 may contain a sensor itself such as a thermostat, a light sensor, etc. The controller may communicate via the transceiver 430 with other sensors 445, a client device 490, a remote system 405, and other household devices 480 such as appliances, lights, smart switches, smart outlets, etc. In some embodiments, the controller 401 may also include a read-only memory (ROM) 420 and a display 450 communicatively-coupled to the processor 410, and a power source 499 that supplies power to the processor 410, the ROM 420, the transceiver 430, the sensor 440, and the display 450.

The processes of the home security system are described in the context of the controller 401, but the remote system 405 may perform some or all of the processes disclosed herein. The remote system 405 is described in detail with respect to FIGS. 5A-5C below. The processor 410 may be configured to receive a first indication that a user is not on the premises of the home on a first day. The processor 410 may place the home security system into an away mode based on the first indication. The processor 410 may receive the first indication on a second day. The indications may be based on data generated by one or more sensors 440, 445 and/or data input into the system from the client device 490, the user, and/or the remote system 405. The processor 410 may place the home security system into the away mode based on the first indication as described above. The processor 410 may be configured to determine that the user will not return for an extended time based on a second indication as described above. It may place the home security system into a vacation mode.

A security event may be detected based on an analysis of the data generated by the sensors (e.g., a door is opened from the outside when there are no authorized users nearby). The processor 410 may generate the second response based on the home security system operating in the vacation mode and provide the second response.

Figure 5A:
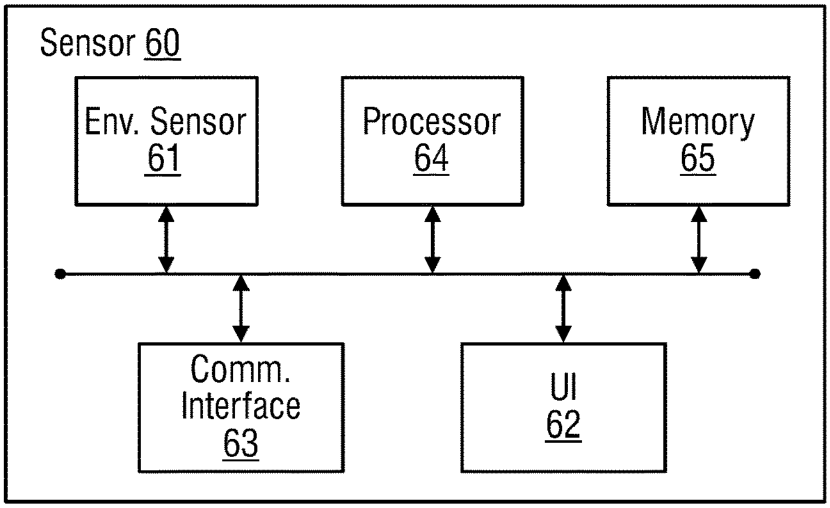
FIG. 5A shows an example sensor as disclosed herein.

A sensor may include hardware in addition to the specific physical sensor that obtains information about the environment. FIG. 5A shows an example sensor as disclosed herein. The sensor 60 may include an environmental sensor 61, such as a temperature sensor, smoke sensor, carbon monoxide sensor, motion sensor, accelerometer, proximity sensor, passive infrared (PIR) sensor, magnetic field sensor, radio frequency (RF) sensor, light sensor, humidity sensor, pressure sensor, microphone, or any other suitable environmental sensor, that obtains a corresponding type of information about the environment in which the sensor 60 is located. A processor 64 may receive and analyze data obtained by the sensor 61, control operation of other components of the sensor 60, and process communication between the sensor and other devices. The processor 64 may execute instructions stored on a computer-readable memory 65. The memory 65 or another memory in the sensor 60 may also store environmental data obtained by the sensor 61. A communication interface 63, such as a Wi-Fi or other wireless interface, Ethernet or other local network interface, or the like may allow for communication by the sensor 60 with other devices. A user interface (UI) 62 may provide information and/or receive input from a user of the sensor. The UI 62 may include, for example, a speaker to output an audible alarm when an event is detected by the sensor 60. illustratively Alternatively, or in addition, the UI 62 may include a light to be activated when an event is detected by the sensor 60. The user interface may be relatively minimal, such as a liquid crystal display (LCD), light-emitting diode (LED) display, or limited-output display, or it may be a full-featured interface such as a touchscreen. Components within the sensor 60 may transmit and receive information to and from one another via an internal bus or other mechanism as will be readily understood by one of skill in the art. One or more components may be implemented in a single physical arrangement, such as where multiple components are implemented on a single integrated circuit. Sensors as disclosed herein may include other components, and/or may not include all of the illustrative components shown.

In some configurations, two or more sensors may generate data that can be used by a processor of a system to generate a response and/or infer a state of the environment. For example, an ambient light sensor in a room may determine that the room is dark (e.g., less than 60 lux). A microphone in the room may detect a sound above a set threshold, such as 60 dB. A processor of a system may determine, based on the data generated by both sensors that it should activate one or more lights in the room. In the event the processor only received data from the ambient light sensor, the system may not have any basis to alter the state of the lighting in the room. Similarly, if the processor only received data from the microphone, the system may lack sufficient data to determine whether activating the lights in the room is necessary, for example, during the day the room may already be bright or during the night the lights may already be on. As another example, two or more sensors may communicate with one another. Thus, data generated by multiple sensors simultaneously or nearly simultaneously may be used to determine a state of an environment and, based on the determined state, generate a response.

As another example, a security system may employ a magnetometer affixed to a door jamb and a magnet affixed to the door. When the door is closed, the magnetometer may detect the magnetic field emanating from the magnet. If the door is opened, the increased distance may cause the magnetic field near the magnetometer to be too weak to be detected by the magnetometer. If the security system is activated, it may interpret such non-detection as the door being ajar or open. In some configurations, a separate sensor or a sensor integrated into one or more of the magnetometer and/or magnet may be incorporated to provide data regarding the status of the door. For example, an accelerometer and/or a compass may be affixed to the door and indicate the status of the door and/or augment the data provided by the magnetometer.

The sensors may be integrated into a home security system, mesh network (e.g., Thread™), or work in combination with other sensors positioned in and/or around an environment.

In some configurations, an accelerometer may be employed to indicate how quickly the door is moving. For example, the door may be lightly moving due to a breeze. This may be contrasted with a rapid movement due to a person swinging the door open. The data generated by the compass, accelerometer, and/or magnetometer may be analyzed and/or provided to a central system such as a controller 73 and/or remote system 74. The data may be analyzed to learn a user behavior, an environment state, and/or as a component of a home security or home automation system. While the above example is described in the context of a door, a person having ordinary skill in the art will appreciate the applicability of the disclosed subject matter to other embodiments such as a window, garage door, fireplace doors, vehicle windows/doors, faucet positions (e.g., an outdoor spigot), a gate, seating position, etc.

Data generated by one or more sensors may indicate a behavior pattern of one or more users and/or an environment state over time, and thus may be used to "learn" such characteristics. For example, data generated by an ambient light sensor in a room of a house and the time of day may be stored in a local or remote storage medium with the permission of an end user. A processor in communication with the storage medium may compute a behavior based on the data generated by the light sensor. The light sensor data may indicate that the amount of light detected increases until an approximate time or time period, such as 3:30 PM, and then declines until another approximate time or time period, such as 5:30 PM, at which point there is an abrupt increase in the amount of light detected. In many cases, the amount of light detected after the second time period may be either below a dark level of light (e.g., under or equal to 60 Ix) or bright (e.g., equal to or above 400 Ix). In this example, the data may indicate that after 5:30 PM, an occupant is turning on/off a light as the occupant of the room in which the sensor is located enters/leaves the room. At other times, the light sensor data may indicate that no lights are turned on/off in the room. The system, therefore, may learn that occupant's patterns of turning on and off lights, and may generate a response to the learned behavior. For example, at 5:30 PM, a smart-home environment or other sensor network may automatically activate the lights in the room if it detects an occupant in proximity to the home. In some embodiments, such behavior patterns may be verified using other sensors. Continuing the example, user behavior regarding specific lights may be verified and/or further refined based upon states of, or data gathered by, smart switches, outlets, lamps, and the like.

Sensors as disclosed herein may operate within a communication network, such as a conventional wireless network, and/or a sensor-specific network through which sensors may communicate with one another and/or with dedicated other devices. In some configurations, one or more sensors may provide information to one or more other sensors, to a central controller, or to any other device capable of communicating on a network with the one or more sensors. A central controller may be general- or special-purpose. For example, one type of central controller is a home automation network that collects and analyzes data from one or more sensors within the home. Another example of a central controller is a special-purpose controller that is dedicated to a subset of functions, such as a security controller that collects and analyzes sensor data primarily or exclusively as it relates to various security considerations for a location. A central controller may be located locally with respect to the sensors with which it communicates and from which it obtains sensor data, such as in the case where it is positioned within a home that includes a home automation and/or sensor network. Alternatively, or in addition, a central controller as disclosed herein may be remote from the sensors, such as where the central controller is implemented as a cloud-based system that communicates with multiple sensors, which may be located at multiple locations and may be local or remote with respect to one another.

Figure 5B:
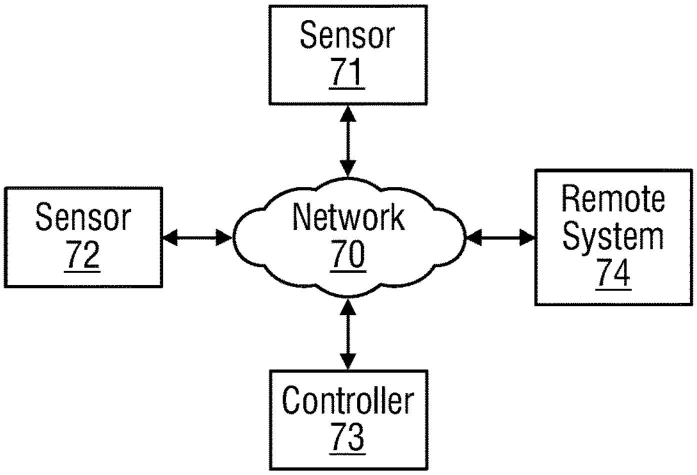
FIG. 5B shows an example of a sensor network as disclosed herein.

FIG. 5B shows an example of a sensor network as disclosed herein, which may be implemented over any suitable wired and/or wireless communication networks. One or more sensors 71, 72 may communicate via a local network 70, such as a Wi-Fi or other suitable network, with each other and/or with a controller 73. The controller may be a general- or special-purpose computer such as a smartphone, a smartwatch, a tablet, a laptop, etc. The controller may, for example, receive, aggregate, and/or analyze environmental information received from the sensors 71, 72. The sensors 71, 72 and the controller 73 may be located locally to one another, such as within a single dwelling, office space, building, room, or the like, or they may be remote from each other, such as where the controller 73 is implemented in a remote system 74 such as a cloud-based reporting and/or analysis system. In some configurations, the system may have multiple controllers 74 such as where multiple occupants' smartphones and/or smartwatches are authorized to control and/or send/receive data to or from the various sensors 71, 72 deployed in the home. Alternatively, or in addition, sensors may communicate directly with a remote system 74. The remote system 74 may, for example, aggregate data from multiple locations, provide instruction, software updates, and/or aggregated data to a controller 73 and/or sensors 71, 72.

The devices of the security system and smart-home environment of the disclosed subject matter may be communicatively connected via the network 70, which may be a mesh-type network such as Thread™, which provides network architecture and/or protocols for devices to communicate with one another. Typical home networks may have a single device point of communications. Such networks may be prone to failure, such that devices of the network cannot communicate with one another when the single device point does not operate normally. The mesh-type network of Thread™, which may be used in the security system of the disclosed subject matter, may avoid communication using a single device. That is, in the mesh-type network, such as network 70, there is no single point of communication that may fail and prohibit devices coupled to the network from communicating with one another.

The communication and network protocols used by the devices communicatively-coupled to the network 70 may provide secure communications, minimize the amount of power used (i.e., be power efficient), and support a wide variety of devices and/or products in a home, such as appliances, access control, climate control, energy management, lighting, safety, and security. For example, the protocols supported by the network and the devices connected thereto may have an open protocol that may carry IPv6 natively.

The Thread™ network, such as network 70, may be easy to set up and secure to use. The network 70 may use an authentication scheme, AES (Advanced Encryption Standard) encryption, or the like to reduce and/or minimize security holes that exist in other wireless protocols. The Thread™ network may be scalable to connect devices (e.g., 2, 5, 10, 20, 50, 100, 150, 200, or more devices) into a single network supporting multiple hops (e.g., to provide communications between devices when one or more nodes of the network is not operating normally). The network 70, which may be a Thread™ network, may provide security at the network and application layers. One or more devices communicatively-coupled to the network 70 (e.g., controller 73, remote system 74, and the like) may store product install codes to ensure only authorized devices can join the network 70. One or more operations and communications of network 70 may use cryptography, such as public-key cryptography.

The devices communicatively-coupled to the net-work 70 of the smart-home environment and/or security system disclosed herein may low power consumption and/or reduced power consumption. That is, devices efficiently communicate to with one another and operate to provide functionality to the user, where the devices may have reduced battery size and increased battery lifetimes over conventional devices. The devices may include sleep modes to increase battery life and reduce power requirements. For example, communications between devices coupled to the network 70 may use the power-efficient IEEE 802.15.4 MAC/PHY protocol. In embodiments of the disclosed subject matter, short messaging between devices on the network 70 may conserve bandwidth and power. The routing protocol of the network 70 may reduce network overhead and latency. The communication interfaces of the devices coupled to the smart-home environment may include wireless system-on-chips to support the low-power, secure, stable, and/or scalable communications network 70.

The sensor network shown in FIG. 5B may be an example of a smart-home environment. The depicted smart-home environment may include a structure, a house, office building, garage, mobile home, or the like. The devices of the smart-home environment, such as the sensors 71, 72, the controller 73, and the network 70 may be integrated into a smart-home environment that does not include an entire structure, such as a single unit in an apartment building, condominium building, or office building.

The smart-home environment can control and/or be coupled to devices outside of the structure. For example, one or more of the sensors 71, 72 may be located outside the structure, for example, at one or more distances from the structure (e.g., sensors 71, 72 may be disposed outside the structure, at points along a land perimeter on which the structure is located, and the like. One or more of the devices in the smart-home environment need not physically be within the structure. For example, the controller 73 which may receive input from the sensors 71, 72 may be located outside of the structure.

The structure of the smart-home environment may include a plurality of rooms, separated at least partly from each other via walls. The walls can include interior walls or exterior walls. Each room can further include a floor and a ceiling. Devices of the smart-home environment, such as the sensors 71, 72, may be mounted on, integrated with and/or supported by a wall, floor, or ceiling of the structure.

The smart-home environment including the sensor network shown in FIG. 5B may include a plurality of devices, including intelligent, multi-sensing, network-connected devices, that can integrate seamlessly with each other and/or with a central server or a cloud-computing system (e.g., controller 73 and/or remote system 74) to provide home-security and smart-home features. The smart-home environment may include one or more intelligent, multi-sensing, network-connected thermostats (e.g., "smart thermostats"), one or more intelligent, network-connected, multi-sensing hazard detection units (e.g., "smart hazard detectors"), and one or more intelligent, multi-sensing, network-connected entryway interface devices (e.g., "smart doorbells"). The smart hazard detectors, smart thermostats, and smart doorbells may be the sensors 71, 72 shown in FIG. 5B.

For example, a smart thermostat may detect ambient climate characteristics (e.g., temperature and/or humidity) and may control an HVAC (heating, ventilating, and air conditioning) system accordingly of the structure. For example, the ambient client characteristics may be detected by sensors 71, 72 shown in FIG. 5B, and the controller 73 may control the HVAC system (not shown) of the structure.

As another example, a smart hazard detector may detect the presence of a hazardous substance or a substance indicative of a hazardous substance (e.g., smoke, fire, flood, or carbon monoxide). For example, smoke, fire, and/or carbon monoxide may be detected by sensors 71, 72 shown in FIG. 5B, and the controller 73 may control an alarm system to provide a visual and/or audible alarm to the user of the smart-home environment.

As another example, a smart doorbell may control doorbell functionality, detect a person's approach to or departure from a location (e.g., an outer door to the structure), and announce a person's approach or departure from the structure via audible and/or visual message that is output by a speaker and/or a display coupled to, for example, the controller 73.

In some embodiments, the smart-home environment of the sensor network shown in FIG. 5B may include one or more intelligent, multi-sensing, network-connected wall switches (e.g., "smart wall switches"), one or more intelligent, multi-sensing, network-connected wall plug interfaces (e.g., "smart wall plugs"). The smart wall switches and/or smart wall plugs may be or include one or more of the sensors 71, 72 shown in FIG. 5B. A smart wall switch may detect ambient lighting conditions, and control a power and/or dim state of one or more lights. For example, a sensor such as sensors 71, 72, may detect ambient lighting conditions, and a device such as the controller 73 may control the power to one or more lights (not shown) in the smart-home environment. Smart wall switches may also control a power state or speed of a fan, such as a ceiling fan. For example, sensors 72, 72 may detect the power and/or speed of a fan, and the controller 73 may adjust the power and/or speed of the fan, accordingly. Smart wall plugs may control supply of power to one or more wall plugs (e.g., such that power is not supplied to the plug if nobody is detected to be within the smart-home environment). For example, one of the smart wall plugs may control supply of power to a lamp (not shown).

In implementations of the disclosed subject matter, a smart-home environment may include one or more intelligent, multi-sensing, network-connected entry detectors (e.g., "smart entry detectors"). Such detectors may be or include one or more of the sensors 71, 72 shown in FIG. 5B. The illustrated smart entry detectors (e.g., sensors 71, 72) may be disposed at one or more windows, doors, and other entry points of the smart-home environment for detecting when a window, door, or other entry point is opened, broken, breached, and/or compromised. The smart entry detectors may generate a corresponding signal to be provided to the controller 73 and/or the remote system 74 when a window or door is opened, closed, breached, and/or compromised. In some embodiments of the disclosed subject matter, the alarm system, which may be included with controller 73 and/or coupled to the network 70 may not be placed in an away mode (e.g., "armed") unless all smart entry detectors (e.g., sensors 71, 72) indicate that all doors, windows, entryways, and the like are closed and/or that all smart entry detectors are in an away mode. In some configurations, such as the door example shown in FIG. 6A and FIG. 6B, the system may be placed in an away mode (e.g., arm) if it can be determined that the distance the door (or window) is ajar is insubstantial (e.g., the opening is not wide enough for a person to fit through).

The smart-home environment of the sensor net-work shown in FIG. 5B can include one or more intelligent, multi-sensing, network-connected doorknobs (e.g., "smart doorknob"). For example, the sensors 71, 72 may be coupled to a doorknob of a door (e.g., doorknobs located on external doors of the structure of the smart-home environment). However, it should be appreciated that smart doorknobs can be provided on external and/or internal doors of the smart-home environment.

The smart thermostats, the smart hazard detectors, the smart doorbells, the smart wall switches, the smart wall plugs, the smart entry detectors, the smart doorknobs, the keypads, and other devices of a smart-home environment (e.g., as illustrated as sensors 71, 72 of FIG. 5B) can be communicatively-coupled to each other via the network 70, and to the controller 73 and/or remote system 74 to provide security, safety, and/or comfort for the smart-home environment.

A user can interact with one or more of the network-connected smart devices (e.g., via the network 70). For example, a user can communicate with one or more of the network-connected smart devices using a computer (e.g., a desktop computer, laptop computer, tablet, or the like) or other portable electronic device (e.g., a smartphone, a tablet, a key FOB, or the like). A webpage or application can be configured to receive communications from the user and control the one or more of the network-connected smart devices based on the communications and/or to present information about the device's operation to the user. For example, the user can view or change the mode of the security system of the home.

One or more users can control one or more of the network-connected smart devices in the smart-home environment using a network-connected computer or portable electronic device. In some examples, some or all of the users (e.g., individuals who live in the home) can register their mobile device and/or key FOBs with the smart-home environment (e.g., with the controller 73). Such registration can be made at a central server (e.g., the controller 73 and/or the remote system 74) to authenticate the user and/or the electronic device as being associated with the smart-home environment, and to provide permission to the user to use the electronic device to control the network-connected smart devices and the security system of the smart-home environment. A user can use their registered electronic device to remotely control the network-connected smart devices and security system of the smart-home environment, such as when the occupant is at work or on vacation. The user may also use their registered electronic device to control the network-connected smart devices when the user is located inside the smart-home environment.

Alternatively, or in addition to registering electronic devices, the smart-home environment may make inferences about which individuals live in the home and are therefore users and which electronic devices are associated with those individuals. As such, the smart-home environment may "learn" who is a user (e.g., an authorized user) and permit the electronic devices associated with those individuals to control the network-connected smart devices of the smart-home environment (e.g., devices communicatively-coupled to the network 70), in some embodiments including sensors used by or within the smart-home environment. Various types of notices and other information may be provided to users via messages sent to one or more user electronic devices. For example, the messages can be sent via email, short message service (SMS), multimedia messaging service (MMS), unstructured supplementary service data (USSD), as well as any other type of messaging services and/or communication protocols.

A smart-home environment may include communication with devices outside of the smart-home environment but within a proximate geographical range of the home. For example, the smart-home environment may include an outdoor lighting system (not shown) that communicates information through the communication network 70 or directly to a central server or cloud-computing system (e.g., controller 73 and/or remote system 74) regarding detected movement and/or presence of people, animals, and any other objects and receives back commands for controlling the lighting accordingly.

The controller 73 and/or remote system 74 can control the outdoor lighting system based on information received from the other network-connected smart devices in the smart-home environment. For example, in the event that any of the network-connected smart devices, such as smart wall plugs located outdoors, detect movement at nighttime, the controller 73 and/or remote system 74 can activate the outdoor lighting system and/or other lights in the smart-home environment.

Figure 5C:
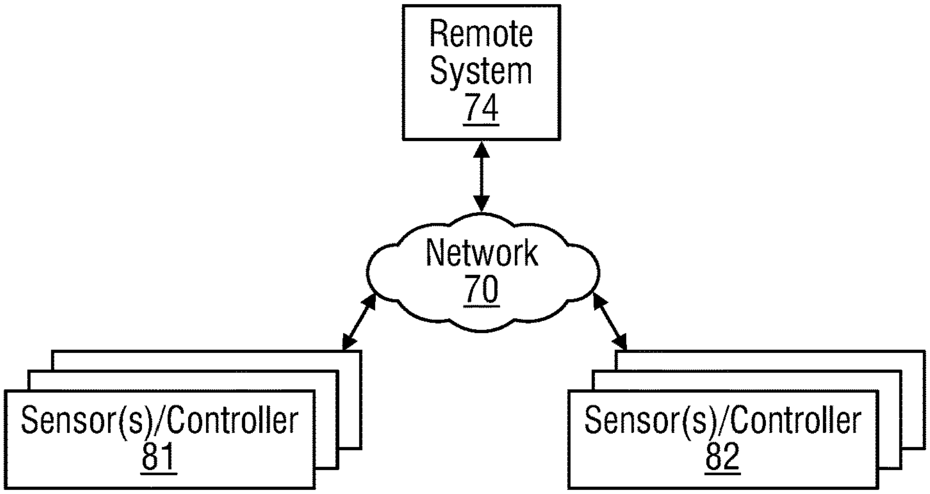
FIG. 5C shows an example configuration of sensors, one or more controllers, and a remote system as disclosed herein.

In some configurations, a remote system 74 may aggregate data from multiple locations, such as multiple buildings, multi-resident buildings, and individual residences within a neighborhood, multiple neighborhoods, and the like. In general, multiple sensor/controller systems 81, 82 as previously described with respect to FIG. 5B may provide information to the remote system 74 as shown in FIG. 5C. The systems 81, 82 may provide data directly from one or more sensors as previously described, or the data may be aggregated and/or analyzed by local controllers such as the controller 73, which then communicates with the remote system 74. The remote system may aggregate and analyze the data from multiple locations, and may provide aggregate results to each location. For example, the remote system 74 may examine larger regions for common sensor data or trends in sensor data, and provide information on the identified commonality or environmental data trends to each local system 81, 82.

Figure 7A:
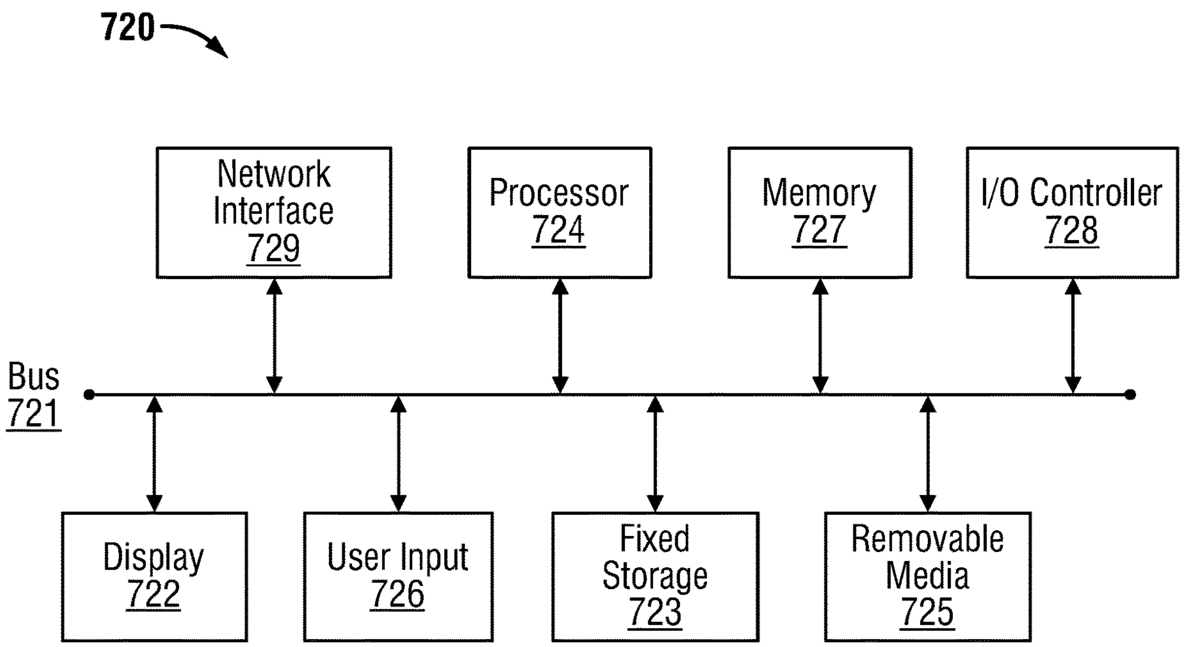
FIG. 7A shows a computer according to an embodiment of the disclosed subject matter.

Embodiments of the presently disclosed subject matter may be implemented in and used with a variety of component and network architectures. FIG. 7A is an example computer 720 suitable for implementations of the presently disclosed subject matter. The computer 720 includes a bus 721 which interconnects major components of the computer 720, such as a central processor 724, a memory 727 (typically RAM, but which may also include ROM, flash RAM, or the like), an input/output controller 728, a user display 722, such as a display screen via a display adapter, a user input interface 726, which may include one or more controllers and associated user input devices such as a keyboard, mouse, and the like, and may be closely coupled to the I/O controller 728, fixed storage 723, such as a hard drive, flash storage, Fibre Channel (FC) network, storage area network (SAN) device, Small Computer System Interface (SCSI) device, and the like, and a removable media component 725 operative to control and receive an optical disk, flash drive, and the like.

The bus 721 allows data communication between the central processor 724 and the memory 727, which may include read-only memory (ROM) or flash memory (neither shown), and random access memory (RAM) (not shown), as previously noted. The RANI is generally the main memory into which the operating system and application programs are loaded. The ROM or flash memory can contain, among other code, the Basic Input-Output system (BIOS) that controls basic hardware operation such as the interaction with peripheral components. Applications resident with the computer 720 are generally stored on and accessed via a computer readable medium, such as a hard disk drive (e.g., fixed storage 723), an optical drive, floppy disk, or other storage medium 725.

The fixed storage 723 may be integral with the computer 720 or may be separate and accessed through other interfaces. A network interface 729 may provide a direct connection to a remote server via a telephone link, to the Internet via an Internet service provider (ISP), or a direct connection to a remote server via a direct network link to the Internet via a POP (point of presence) or other technique. The network interface 729 may provide such connection using wireless techniques, including digital cellular telephone connection, Cellular Digital Packet Data (CDPD) connection, digital satellite data connection, or the like. For example, the network interface 729 may allow the computer to communicate with other computers via one or more local, wide-area, or other networks, as shown in FIG. 7B.

Many other devices or components (not shown) may be connected in a similar manner (e.g., document scanners, digital cameras, and so on). Conversely, all of the components shown in FIG. 7A need not be present to practice the present disclosure. The components can be interconnected in different ways from that shown. The operation of a computer such as that shown in FIG. 7A is readily known in the art and is not discussed in detail in this application. Code to implement the present disclosure can be stored in computer-readable storage media such as one or more of the memory 727, fixed storage 723, removable media 725, or on a remote storage location.

Figure 7B:
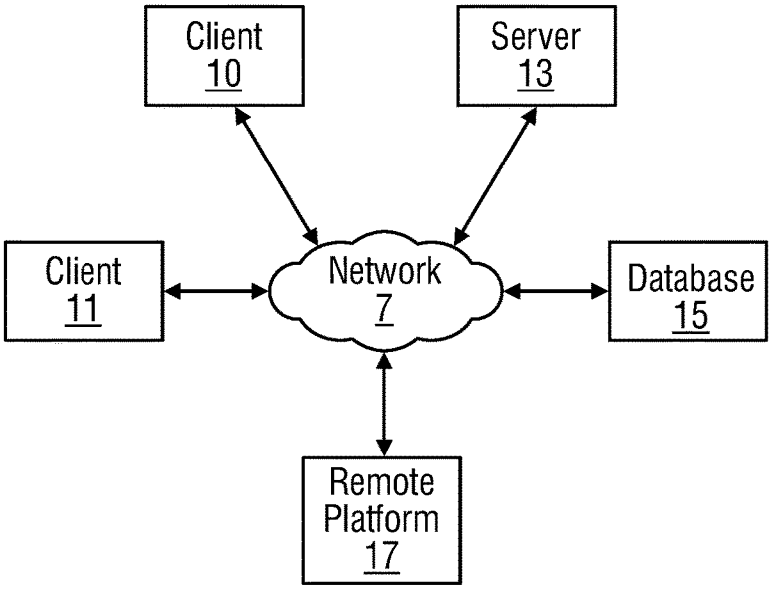
FIG. 7B shows a network configuration according to an embodiment of the disclosed subject matter.

FIG. 7B shows an example network arrangement according to an embodiment of the disclosed subject matter. One or more clients 10, 11, such as local computers, smart phones, tablet computing devices, and the like may connect to other devices via one or more networks 7. The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15.

Figure 8A:
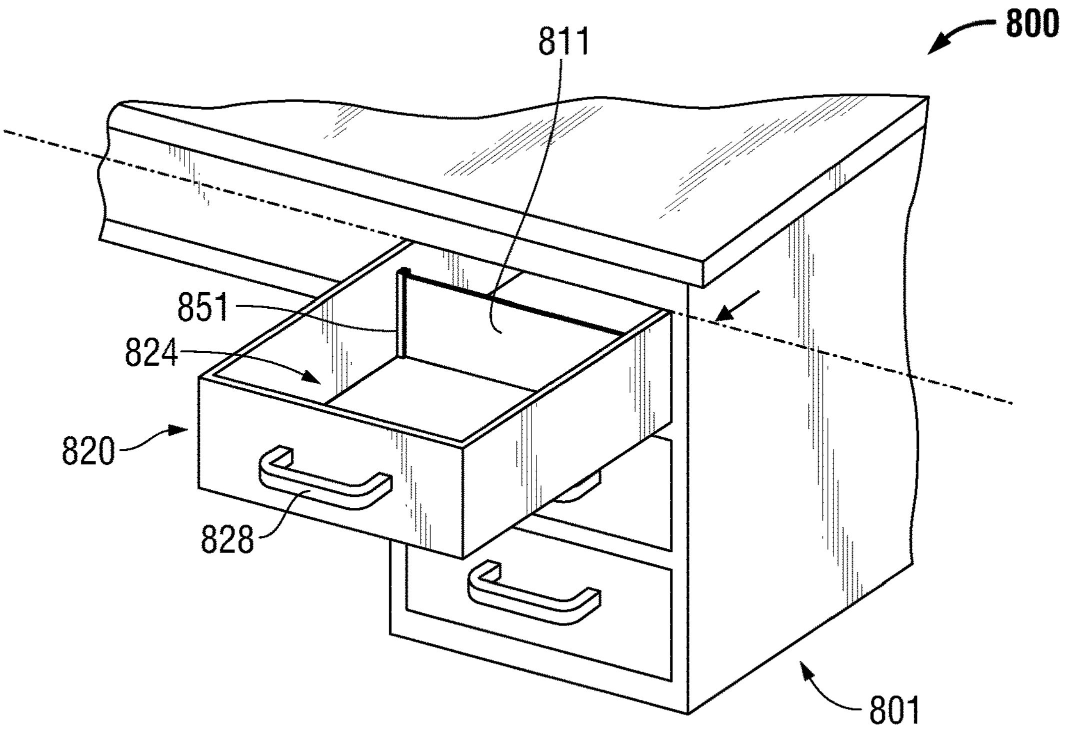
FIG. 8A shows an example of an object (e.g., desk) including an interior region and a drawer received in the interior region for sliding movement between closed and open positions, the drawer having at least one compartment defined therein, according to an embodiment of the disclosed subject matter.
Figure 8B:
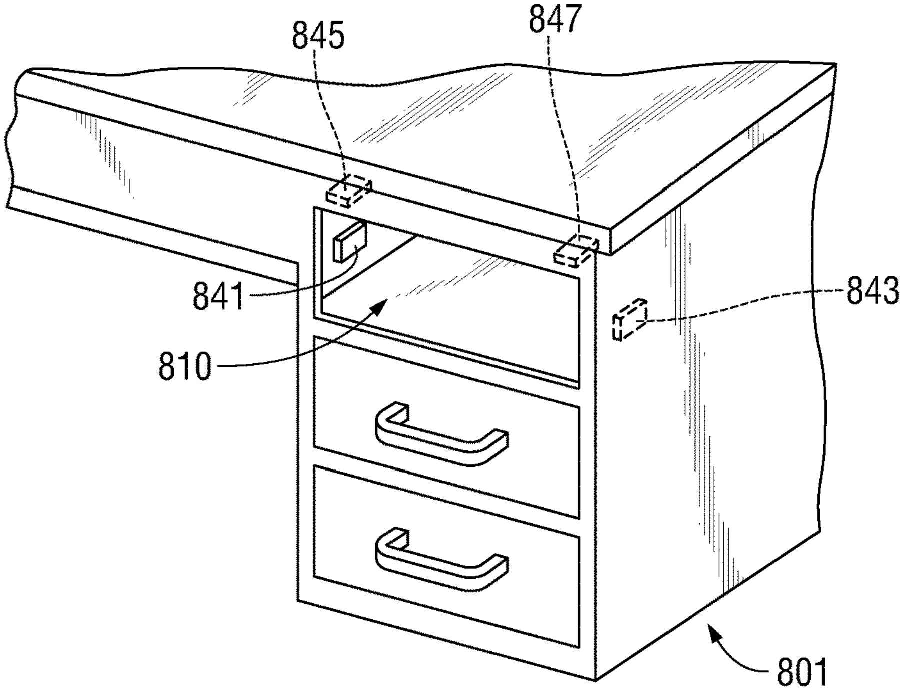
FIG. 8B shows a configuration of sensors associated with the interior region of the object of FIG. 8A.
Figure 8C:
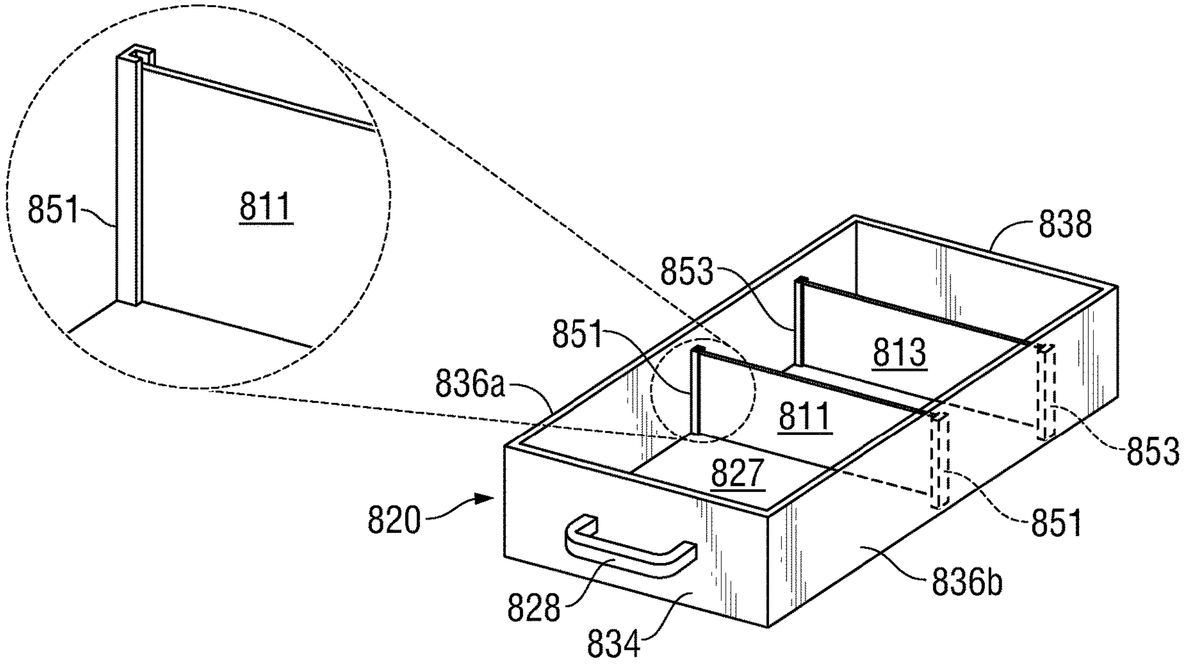
FIG. 8C is a perspective view of an example of a drawer (e.g., desk drawer), along with an enlarged view of an example magnetic member shown engaged with an end portion of a drawer partition, according to an embodiment of the disclosed subject matter.

FIGS. 8A-8C show an example system 800 including a desk 801 with slidable drawers defining one or more compartments therein. In some embodiments of the disclosed subject matter, the system 800 may be a stand-alone, self-monitoring system. In other embodiments, the system 800 may be monitored by a central station. In some embodiments, the system 800 may be selectively switchable between a stand-alone, self-monitoring system and a system monitored by a central station. In some embodiments, the system 800 may provide, or be part of, a DIY security system. In some embodiments the system 800 may be part of a smart-home environment.

In an example embodiment shown in FIGS. 8A-8C, the desk 801 includes an interior region 810 (shown in FIG. 8B) and a drawer 820 (shown in FIG. 8A and FIG. 8C) received in the interior region 810 for sliding movement between closed and open positions. The drawer 820 defines a compartment 824 therein and includes a bottom 827, a pair of lateral side walls **836*a* and 836*b*, a rear wall 838, a front wall 834, and may include a handle 828 affixed to the front wall 834. In embodiments, the desk 801 includes one or more sensors operably associated with the drawer 820. A processor is communicatively-coupled to the one or more sensors to determine an alarm event based on activation of at least one sensor of the one or more sensors. In some embodiments, the one or more sensors are reactive to a magnetic field through detection of one or more magnets affixed to an inner surface of the lateral side walls 836*a* and 836*b***. A sensor reactive to a magnetic field may include, for example, a Hall Effect sensor, a tunneling magnetic resistance sensor, or the like.

In embodiments, the desk 801 includes a first sensor 841 and may include a second sensor 843. The first sensor 841 and the second sensor 843 may be located, for example, on opposing lateral walls defining, in part, the interior region 810. Additionally, or alternatively, the desk 801 may include a third sensor 845 and/or a fourth sensor 843 located on an upper wall defining, in part, the interior region 810. In embodiments, the desk 801 includes one or more partitions secured by one or more magnetic members. In an example embodiment shown in FIG. 8C, the drawer 820 includes two partitions (first partition 811, second partition 813) and two pairs of magnetic members (first magnetic member 851, second magnetic member 853). As depicted in FIG. 8C, the first magnetic members 851 and the second magnetic members 853 are u-channel shaped and configured to receive end portions of the first partition 811 and the second partition 813. The first magnetic members 851 and the second magnetic members 853 may be affixed to the inner surface of the first partition 811 and the second partition 813 by adhesive, double sided tape, or by other appropriate securing means.

In embodiments, when the drawer is extended from within the interior region 810 to a first position, data from one or more sensors indicative of a first configuration of the desk 801 is communicated to a processor. For example, in the first configuration of the desk 801, a partition (e.g., first partition 811) is disposed in vertical alignment with the proximal edge of the desk 801 (demarked by the dashed line in FIG. 8A). As described above, in some embodiments of the disclosed subject matter, repeated activation of a sensor a predetermined number of times (e.g., three times) within a predetermined timeframe is indicative of an alarm event, which may be, for example, a help alert alarm or a panic alarm. Thus, in some embodiments, repeated opening of the drawer 820 to position a partition (or two or more partitions sequentially in a predetermined order) in vertical alignment with the proximal edge of the desk 801 may be indicative of an alarm event. In other embodiments, where the system 300 arms the security alarm for the premises 301, including arming a desk alarm system, the repeated opening of the drawer 820 to position a partition (or two or more partitions sequentially in a predetermined order) in vertical alignment with the proximal edge of the desk 801 may be used to disarm the desk alarm system.

Figure 9:
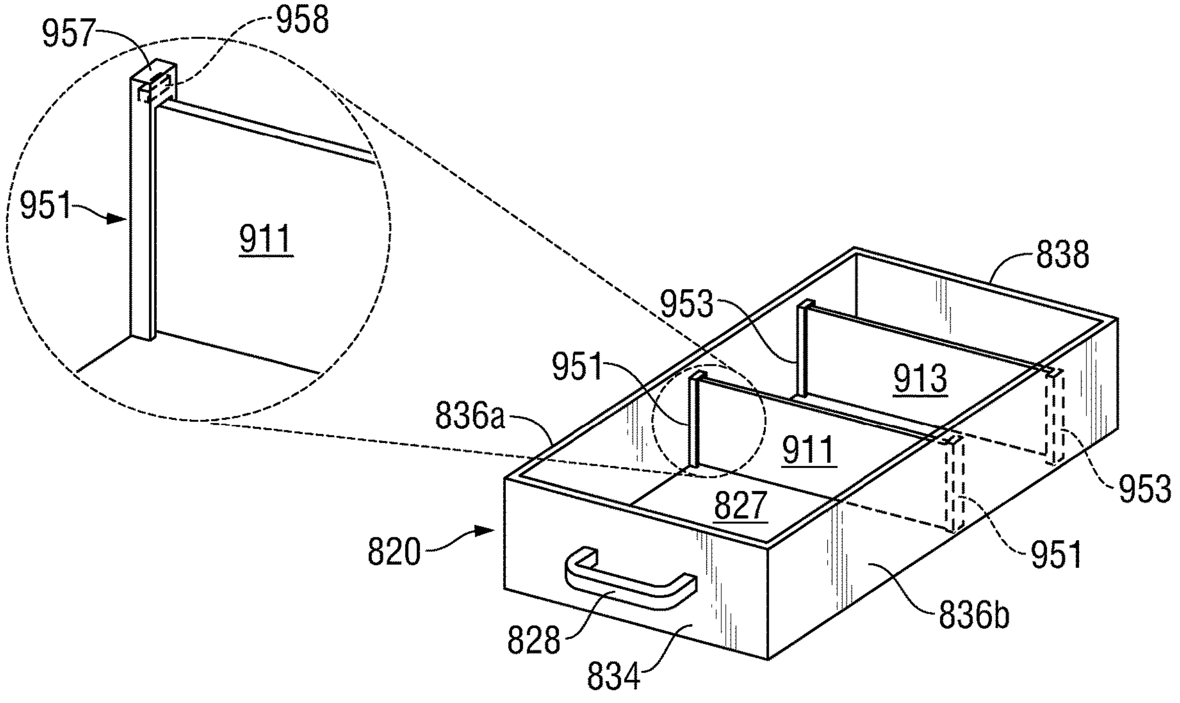
FIG. 9 is a perspective view of an example of a drawer (e.g., desk drawer) having at least one compartment defined therein, along with an enlarged view of an example sensor shown engaged with an end portion of a drawer partition, according to an embodiment of the disclosed subject matter.

FIG. 9 shows an example of a drawer (e.g., drawer 820) including two partitions (first partition 911, second partition 913) and two pairs of fastener members (first fastener member 951, second fastener member 953). In embodiments, the first fastener member 951 includes a housing 957 and a sensor 958 disposed within the housing 957.

Figure 10:
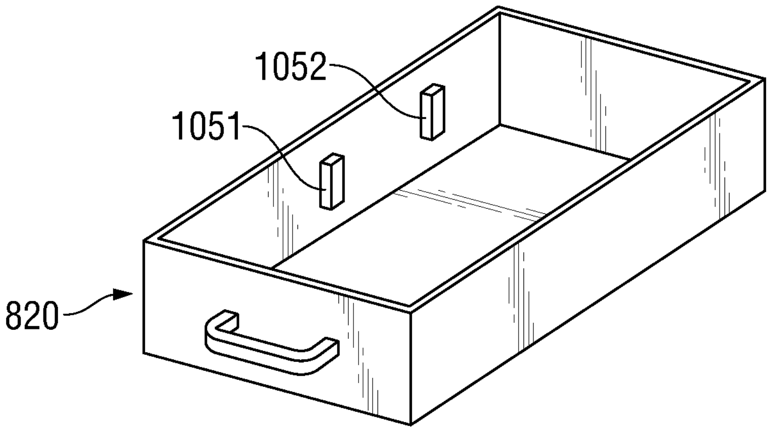
FIG. 10 is a perspective view of an example of a drawer (e.g., desk drawer) having at least one compartment defined therein, shown with a configuration of sensors, according to an embodiment of the disclosed subject matter.

FIG. 10 shows an example of a drawer (e.g., drawer 820) having a compartment defined and including a configuration of sensors (first sensor 1051, second sensor 1052), according to an embodiment of the disclosed subject matter.

Figure 11A:
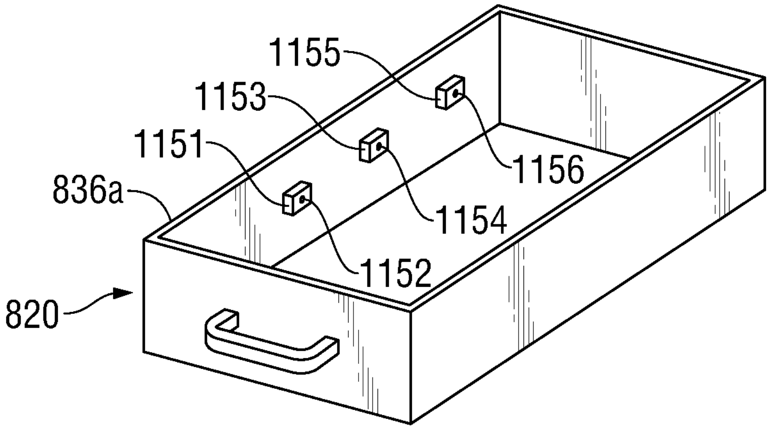
FIG. 11A is a perspective view of an example of a drawer (e.g., desk drawer) having at least one compartment defined therein, shown with a configuration of sensors, according to an embodiment of the disclosed subject matter.
Figure 11B:
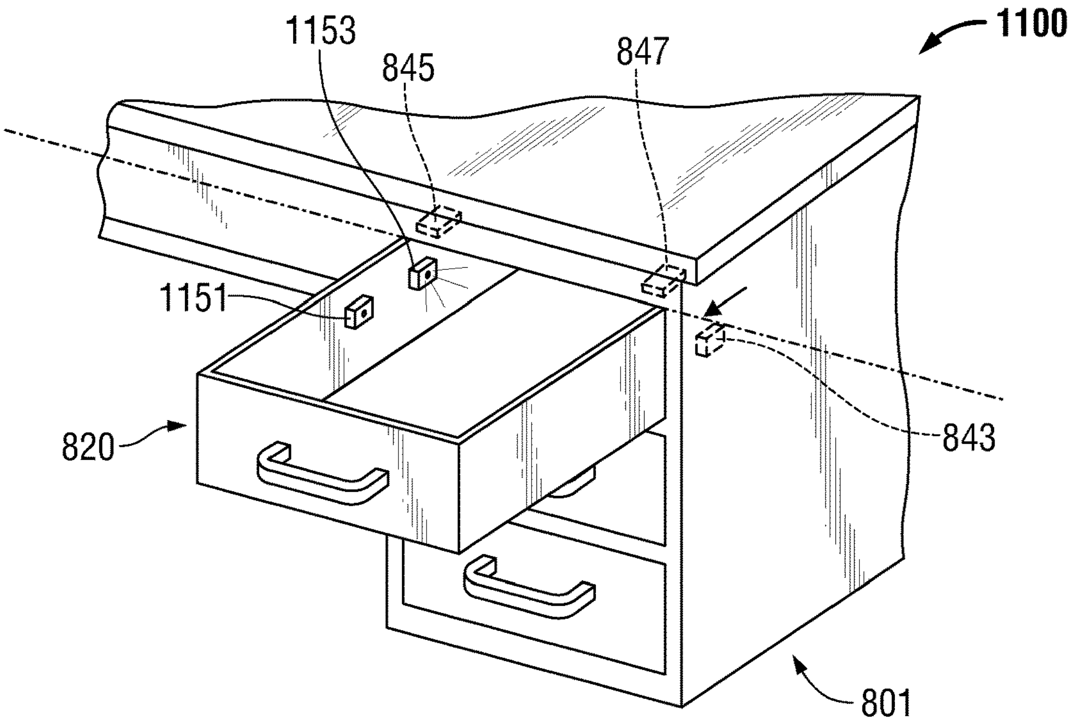
FIG. 11B shows an example of the object (e.g., desk) including an interior region and a drawer received in the interior region for sliding movement between closed and open positions, the object shown in a first configuration, according to an embodiment of the disclosed subject matter.
Figure 11C:
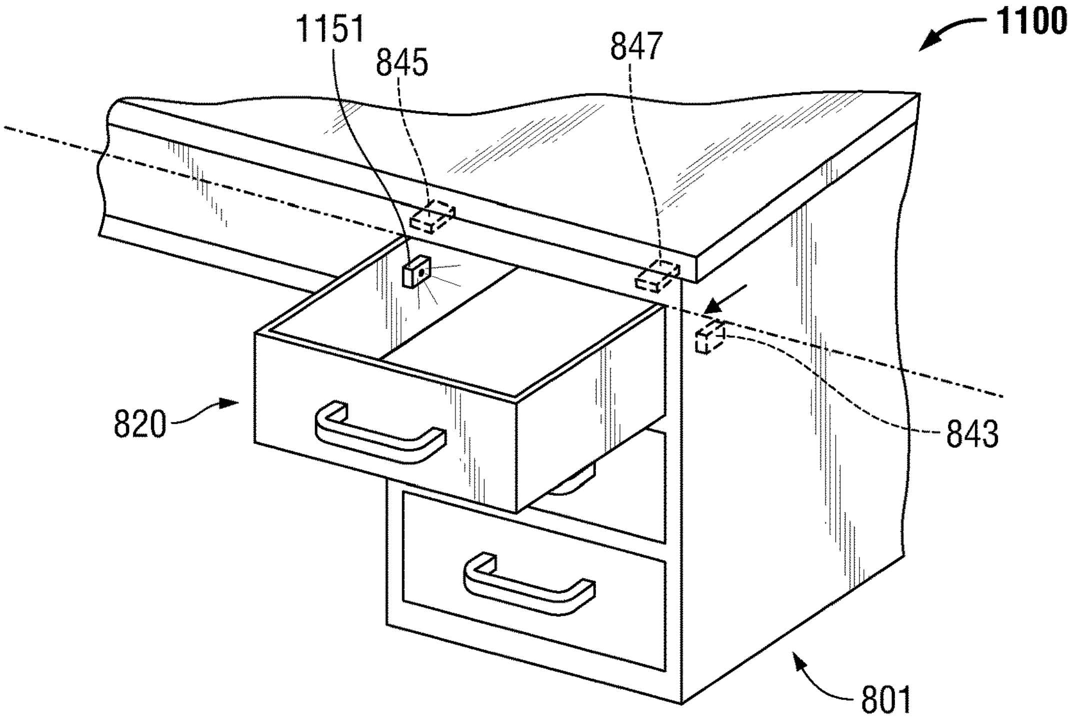
FIG. 11C shows the object of FIG. 11B in a second configuration according to an embodiment of the disclosed subject matter.

FIGS. 11A-11C show an example system 1100 including a desk 801 with slidable drawers defining one or more compartments therein. In some embodiments of the disclosed subject matter, the system 1100 may be a stand-alone, self-monitoring system. In other embodiments, the system 1100 may be monitored by a central station. In some embodiments, the system 1100 may be selectively switchable between a stand-alone, self-monitoring system and a system monitored by a central station. In some embodiments, the system 1100 may provide, or be part of, a DIY security system. In some embodiments the system 1100 may be part of a smart-home environment.

In an example embodiment shown in FIG. 11A, the drawer 820 includes a first sensor 1151 and a first light-emitting element 1152, a second sensor 1153 and a second light-emitting element 1154, and a third sensor 1155 and a third light-emitting element 1156. The first light-emitting element 1152, second light-emitting element 1154, and third light-emitting element 1156 are operable to provide a visual indicator of alignment of the proximal edge of the desk 801 (demarked by the dashed line in FIG. 11A), and may be configured to emit different colors of light.

More generally, various embodiments of the presently disclosed subject matter may include or be implemented in the form of computer-implemented processes and apparatuses for practicing those processes. The disclosed subject matter also may be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions.

Implementations may use hardware that includes a processor, such as a general-purpose microprocessor and/or an Application Specific Integrated Circuit (ASIC) that includes all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description, for purpose of explanation, has been described with reference to specific embodiments. However, the illustrative descriptions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

Although embodiments have been described in detail with reference to the accompanying drawings for the purpose of illustration and description, it is to be understood that the disclosed systems and processes and apparatus are not to be construed as limited thereby. All or a portion of any embodiment may be utilized with all or a portion of any other embodiments, unless stated otherwise. It will be apparent to those of ordinary skill in the art that various modifications to the foregoing embodiments may be made without departing from the scope of the disclosure. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A system comprising:

a furniture piece including an interior region, a proximal edge surface, and at least one drawer receivable within the interior region, the at least one drawer defining a compartment;

a first partition disposed within the compartment;

one or more additional partitions disposed within the compartment and spaced apart from the first partition;

at least one sensor operably associated with the furniture piece, the at least one sensor operable for detecting positioning of at least either one of the first partition and the one or more additional partitions in vertical alignment with the proximal edge surface; and a processor communicatively coupled to the at least one sensor, the processor configured to determine an alarm event based on a plurality of activations of the at least one sensor, each of the plurality of activations indicative of successive positioning of at least either one of the first partition and the one or more additional partitions in vertical alignment with the proximal edge surface.

2. The system of claim 1, wherein the at least one drawer includes a pair of lateral side walls and one or more magnetic members, the one or more magnetic members disposed in association with at least one of the pair of lateral side walls, and wherein end portions of the at least either one of the first partition and the one or more additional partitions are disposed in association with the one or more magnetic members.

3. The system of claim 2, wherein the at least one sensor is reactive to a magnetic field through detection of the one or more magnetic members.

4. The system of claim 2, wherein the one or more magnetic members are u-channel shaped and configured to receive the end portions of the at least either one of the first partition and the one or more additional partitions.

5. A system comprising:

a furniture piece including an interior region, a proximal edge surface, a first drawer receivable within the interior region, and a second drawer receivable within the interior region, the first drawer defining a first compartment, the second drawer defining a second compartment;

a first partition disposed within the first compartment;

a second partition disposed within the second compartment;

a plurality of sensors operably associated with the furniture piece, the plurality of sensors operable for detecting positioning of the first partition and the second partition in vertical alignment with the proximal edge surface; and a processor communicatively coupled to the plurality of sensors, the processor configured to determine an alarm event based on activations of the plurality of sensors, each of the activations indicative of successive positioning of at least either one of the first partition and the second partition in vertical alignment with the proximal edge surface.

* * * * *